US012736950B2

(12) United States Patent
Nookala et al.

(10) Patent No.: US 12,736,950 B2
(45) Date of Patent: Sep. 15, 2026

(54) ASSET COLLABORATION FOR MULTIPLE SYSTEMS

(71) Applicant: SAP SE, Walldorf (DE)

(72) Inventors: Ranjith Kumar Nookala, Bengaluru (IN); Prasenjit Dey, Bengaluru (IN)

(73) Assignee: SAP SE, Walldorf (DE)

( * ) Notice: Subject to any disclaimer, the term of this patent is extended or adjusted under 35 U.S.C. 154(b) by 621 days.

(21) Appl. No.: 18/317,560

(22) Filed: May 15, 2023

(65) Prior Publication Data

US 2024/0385598 A1 Nov. 21, 2024

(51) Int. Cl.
*G05B 19/418* (2006.01)
*G06Q 40/06* (2012.01)

(52) U.S. Cl.
CPC ..... *G05B 19/4183* (2013.01); *G05B 19/4185* (2013.01); *G06Q 40/06* (2013.01); *G06Q 40/063* (2025.08)

(58) Field of Classification Search
CPC ............ G05B 19/4183; G05B 19/4185; G06Q 40/06; G06Q 40/063
See application file for complete search history.

(56) References Cited

U.S. PATENT DOCUMENTS

2015/0074749 A1* 3/2015 Vasko ..................... H04L 67/12 726/1
2023/0058094 A1* 2/2023 Stump ............. G05B 19/41845

* cited by examiner

*Primary Examiner* — Aaron Tutor
(74) *Attorney, Agent, or Firm* — Buckley, Maschoff & Talwalkar LLC

(57) ABSTRACT

A system and method including generating a representation of an object associated with an equipment in an equipment management network, including associating a first identifier for the object in the equipment management network and specifying a first service integrated with the equipment management network to associate with the object; automatically transmitting an event notification from the equipment management network to the first service to inform the first service of the object in the equipment management network; receiving, from the first service, an indication of an external identifier associated with a replication of the object in the first service; correlating the first identifier associated with the object with the external identifier associated with the replication of the object in the first service; and storing a record of the correlation in a data store of the equipment management network.

17 Claims, 24 Drawing Sheets

Figure 3:
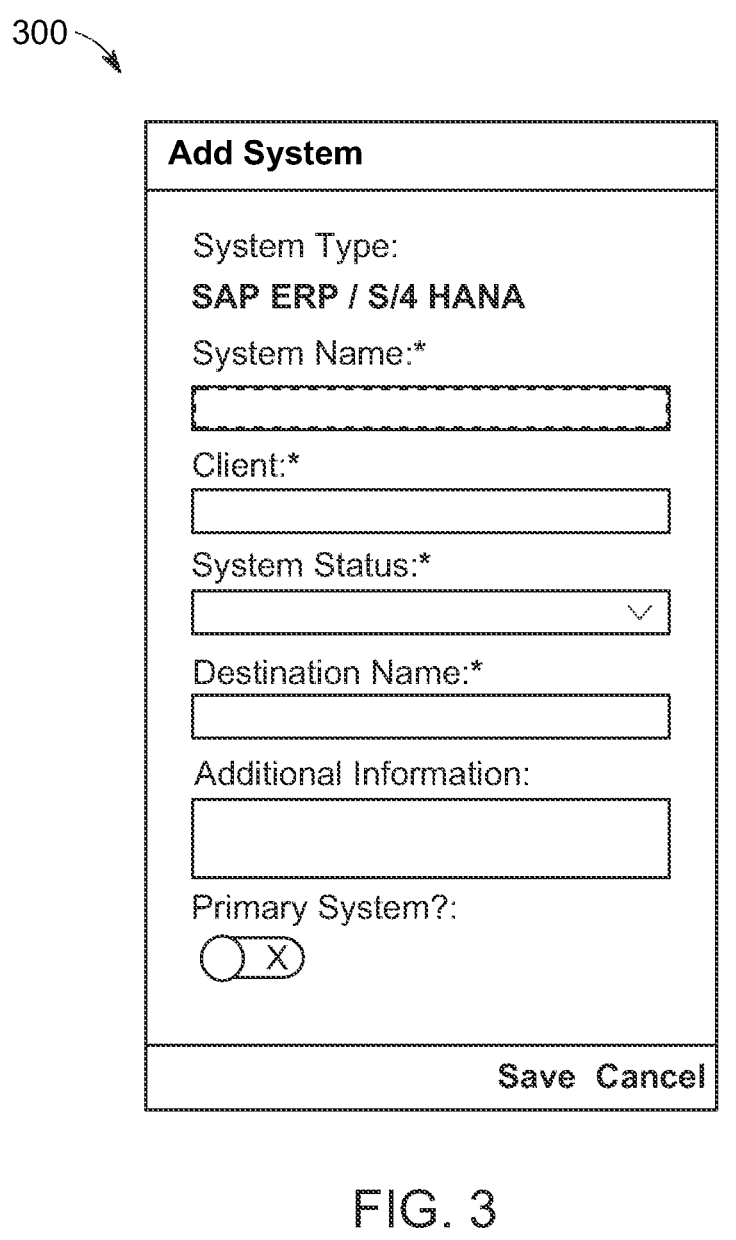

300

Add System

System Type:

SAP ERP / S/4 HANA

System Name:*

Client:*

System Status:*

Destination Name:*

Additional Information:

Primary System?:

X

Save Cancel

External IDs

Object ID
0113CB30EF1247B2A139B83F028DFA0B

External IDs 610 Search Add Edit Delete

| System Type | System Name | Object Type | External ID |
|---|---|---|---|
| SAP ERP / S/4 HANA | QKJ-298 | Equipment | 10000249 |

605

Close

External IDs

Object ID
12743A1CB895435B9D32F18611AAA17E

External IDs 810 Search Add Edit 805 Delete

| System Type | System Name | Object Type | External ID |
| --- | --- | --- | --- |
| SAP ERP / S/4 HANA | SVL-920 | Equipment | 10087070 |

Close

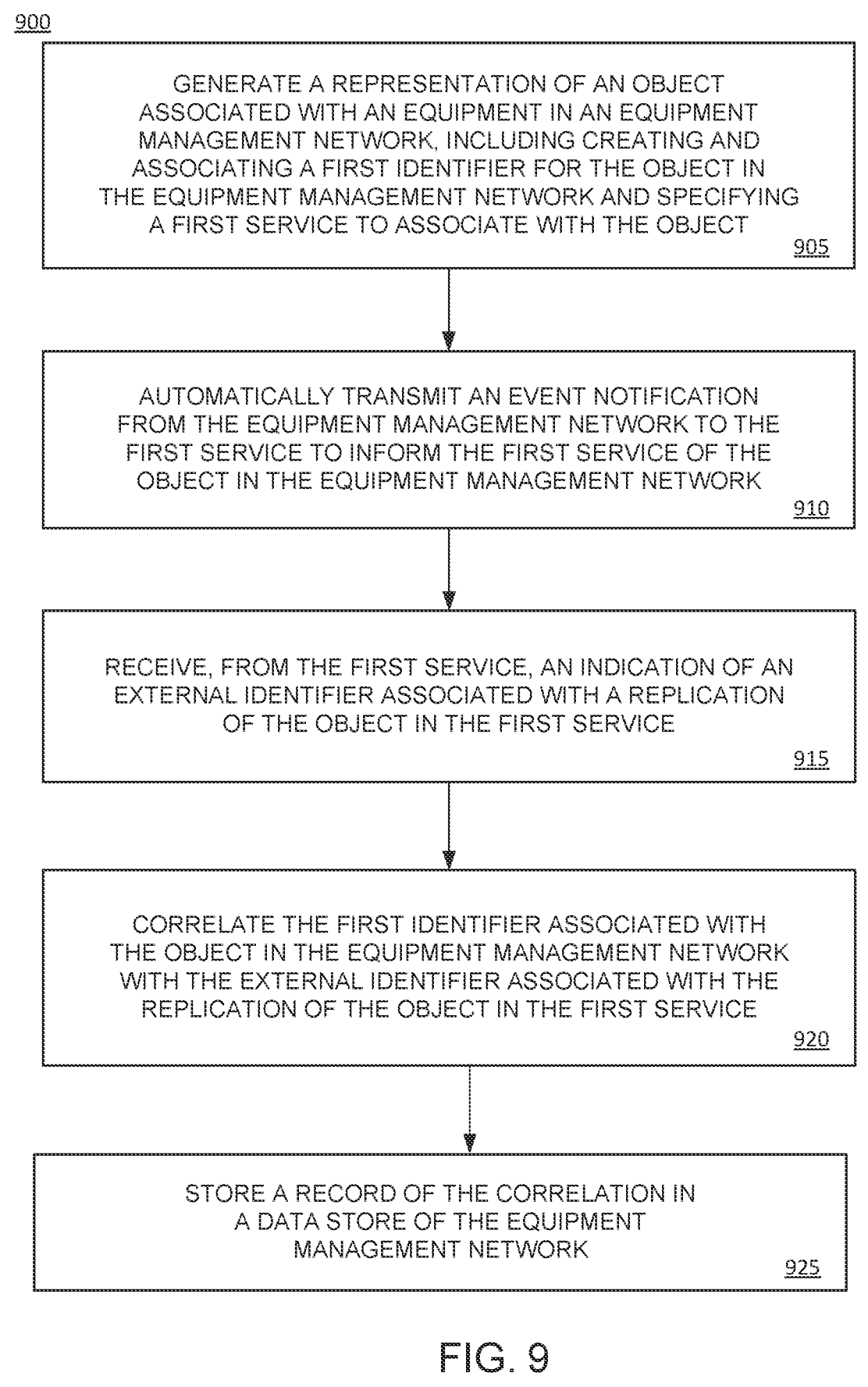

GENERATE A REPRESENTATION OF AN OBJECT ASSOCIATED WITH AN EQUIPMENT IN AN EQUIPMENT MANAGEMENT NETWORK, INCLUDING CREATING AND ASSOCIATING A FIRST IDENTIFIER FOR THE OBJECT IN THE EQUIPMENT MANAGEMENT NETWORK AND SPECIFYING A FIRST SERVICE TO ASSOCIATE WITH THE OBJECT
905

AUTOMATICALLY TRANSMIT AN EVENT NOTIFICATION FROM THE EQUIPMENT MANAGEMENT NETWORK TO THE FIRST SERVICE TO INFORM THE FIRST SERVICE OF THE OBJECT IN THE EQUIPMENT MANAGEMENT NETWORK
910

RECEIVE, FROM THE FIRST SERVICE, AN INDICATION OF AN EXTERNAL IDENTIFIER ASSOCIATED WITH A REPLICATION OF THE OBJECT IN THE FIRST SERVICE
915

CORRELATE THE FIRST IDENTIFIER ASSOCIATED WITH THE OBJECT IN THE EQUIPMENT MANAGEMENT NETWORK WITH THE EXTERNAL IDENTIFIER ASSOCIATED WITH THE REPLICATION OF THE OBJECT IN THE FIRST SERVICE
920

STORE A RECORD OF THE CORRELATION IN A DATA STORE OF THE EQUIPMENT MANAGEMENT NETWORK
925

FIG. 9

Show Filters

1215 for it in this equipment list ×

New Publish Group Request Model

Basic

| Phase | Status | Changed On | | SAP ERP System | |
|---|---|---|---|---|---|
| Planned | Unpublished | Feb 21, 2023 | | QKJ-298 | > |
| Fully Operational | In Revision | Feb 21, 2023 | | QKJ-298 | > |
| Fully Operational | Published | Feb 20, 2023 | | QKJ-298 | > |
| Planned | Unpublished | Feb 20, 2023 | | QKJ-298 | > |
| Planned | Published | Feb 20, 2023 | | QKJ-298 | > |
| Fully Operational | Published | Feb 20, 2023 | | QKJ-298 | > |
| Fully Operational | Published | Feb 20, 2023 | | QKJ-298 | > |
| Fully Operational | Published | Feb 20, 2023 | | QKJ-298 | > |
| Planned | Published | Feb 20, 2023 | | QKJ-298 | > |
| Fully Operational | Published | Feb 19, 2023 | | QKJ-298 | > |
| Planned | Unpublished | Feb 19, 2023 | | QKJ-298 | > |
| Planned | Published | Feb 16, 2023 | | QKJ-298 | > |

Figure 14:
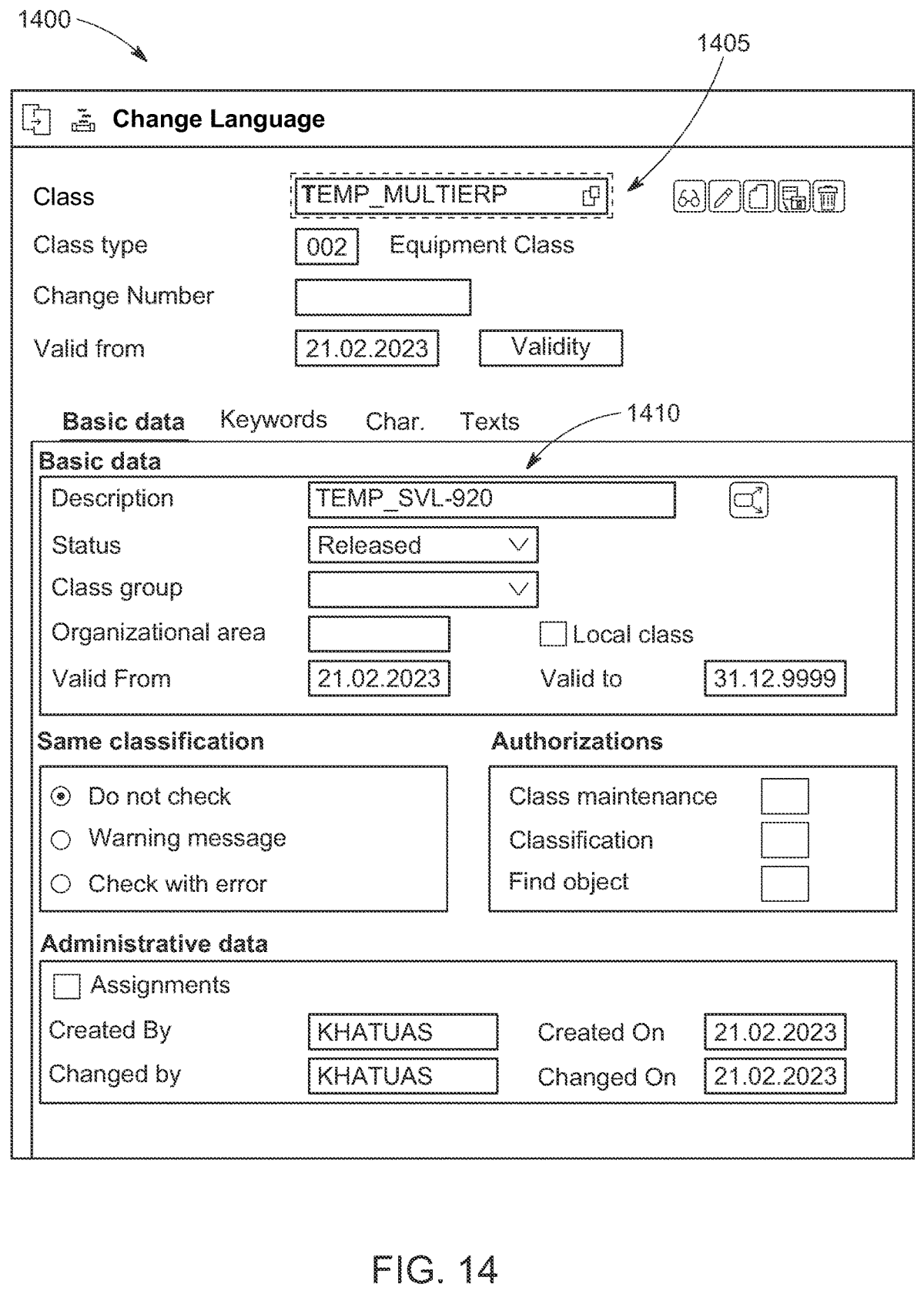

Change Language

Class TEMP_MULTIERP

Class type 002 Equipment Class

Change Number

Valid from 21.02.2023 Validity

Basic data Keywords Char. Texts

1410

Basic data

Description TEMP_SVL-920

Status Released

Class group

Organizational area Local class

Valid From 21.02.2023 Valid to 31.12.9999

Same classification

Do not check

Warning message

Check with error

Authorizations

Class maintenance

Classification

Find object

Administrative data

Assignments

Created By KHATUAS Created On 21.02.2023

Changed by KHATUAS Changed On 21.02.2023

Figure 16:
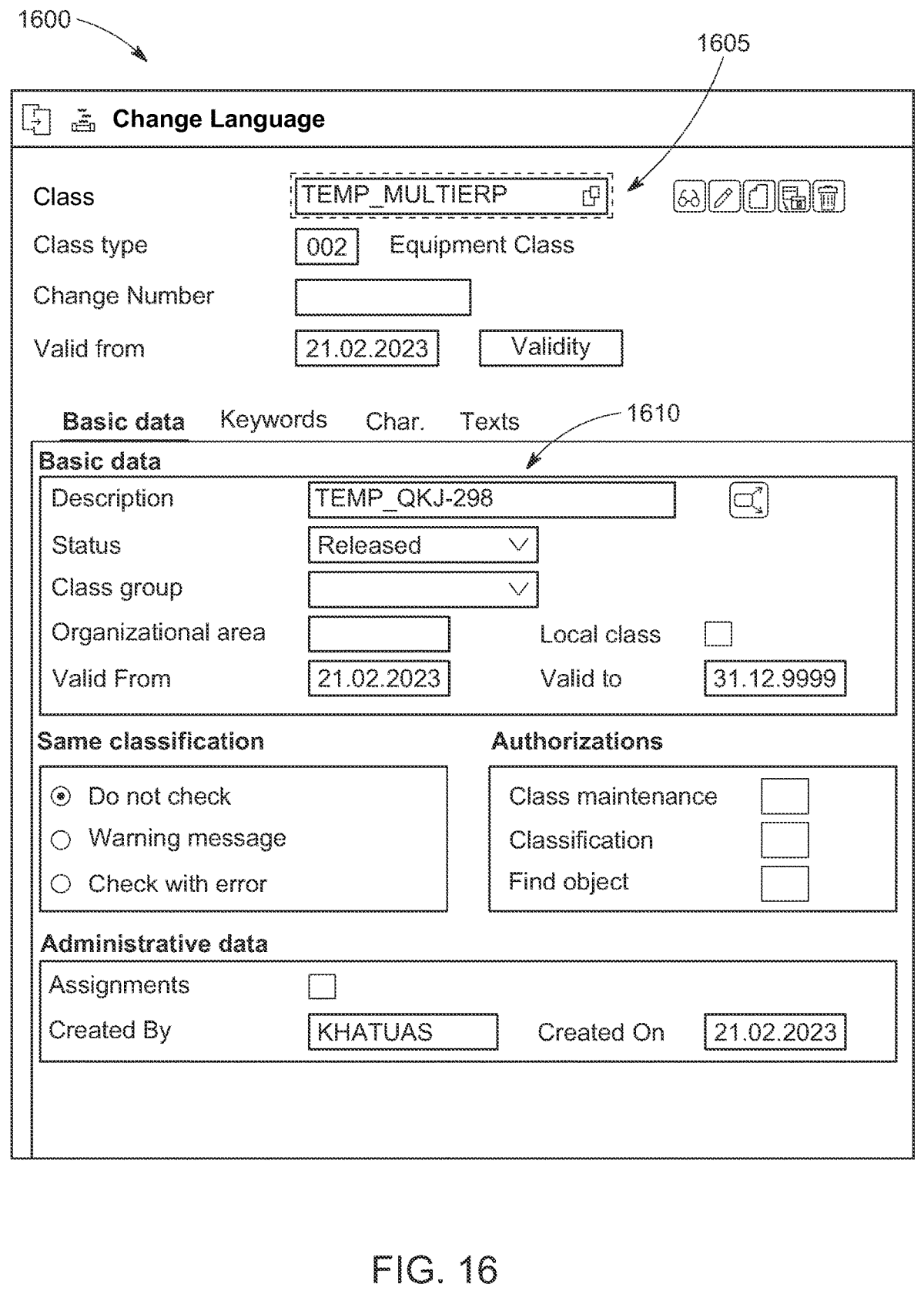

Change Language

Class TEMP_MULTIERP

Class type 002 Equipment Class

Change Number

Valid from 21.02.2023 Validity

Basic data Keywords Char. Texts

1610

Basic data

Description TEMP_QKJ-298

Status Released

Class group

Organizational area

Local class

Valid From 21.02.2023

Valid to 31.12.9999

Same classification

Do not check

Warning message

Check with error

Authorizations

Class maintenance

Classification

Find object

Administrative data

Assignments

Created By KHATUAS

Created On 21.02.2023

External IDs

Object ID

5D00297434194511BF8E1B9DABF4D6D5

External IDs

Search Add Edit Delete

| System Type | System Name | Object Type | External ID |
|---|---|---|---|
| SAP ERP / S/4 HANA | SVL-930 | Equipment | 10076850 |

1810

1805

Close

| OBJECT TYPE | FIELDS |
| --- | --- |
| EQUIPMENT | Item Number, Model Number, Manufacture Date, External IDs, Object ID |
| CLASS | Title, Creator Name, Revision Number, External IDs, Object IDs |
| | |

ASSET COLLABORATION FOR MULTIPLE SYSTEMS

BACKGROUND

Numerous different enterprises or entities might interact with an asset or other equipment throughout the lifecycle of the equipment. For example, a manufacturer of the equipment may initially produce the equipment, a plant operator might operate the equipment once it is installed in their plant, and the plant operator may further have the equipment in their plant maintained by one or more outside service providers, where the service providers might use contractors and/or subcontractors to service the equipment. Each of these entities may typically have one or more backend systems supporting and implementing the processes related to their interactions related to the equipment.

The different entities, via their backend system(s), may generate different data objects representative of and associated with the equipment. The plurality of entities might want to collaborate with each other, including sharing access to the different data objects created in their respective backend systems. However, efficiently and securely sharing the data objects amongst the different entities and their corresponding different backend systems is a complex, if not impossible, undertaking given, for example, the separation between the different backend systems. The process of secure, responsible sharing of data objects associated with equipment in multiple different backend systems is not typically provided by equipment management networks.

Accordingly, it would therefore be desirable to provide a framework for integrating multiple systems and services with an equipment management network to, for example, support and facilitate an efficient and accurate collaboration and sharing of data between the multiple systems and services and the equipment management network.

BRIEF DESCRIPTION OF THE DRAWINGS

FIG. 3 is an illustrative outward facing user interface for defining a service in an equipment management network, according to an example embodiment;

FIG. 6 is an illustrative inbound process flow related to an integrated equipment management network, according to an example embodiment;

FIG. 8 is an illustrative outward facing user interface presenting a view of an external ID associated with a data object, according to an example embodiment;

FIG. 9 is an illustrative outward facing user interface presenting a view of another service integrated with an equipment management network, according to some example embodiments;

FIG. 14 is an illustrative outward facing user interface related to synchronization of a data object from multiple services in an equipment management network, according to an example embodiment;

FIG. 16 is an illustrative outward facing user interface presenting a view related to a class of data objects, according to an example embodiment;

DETAILED DESCRIPTION

Figure 1:
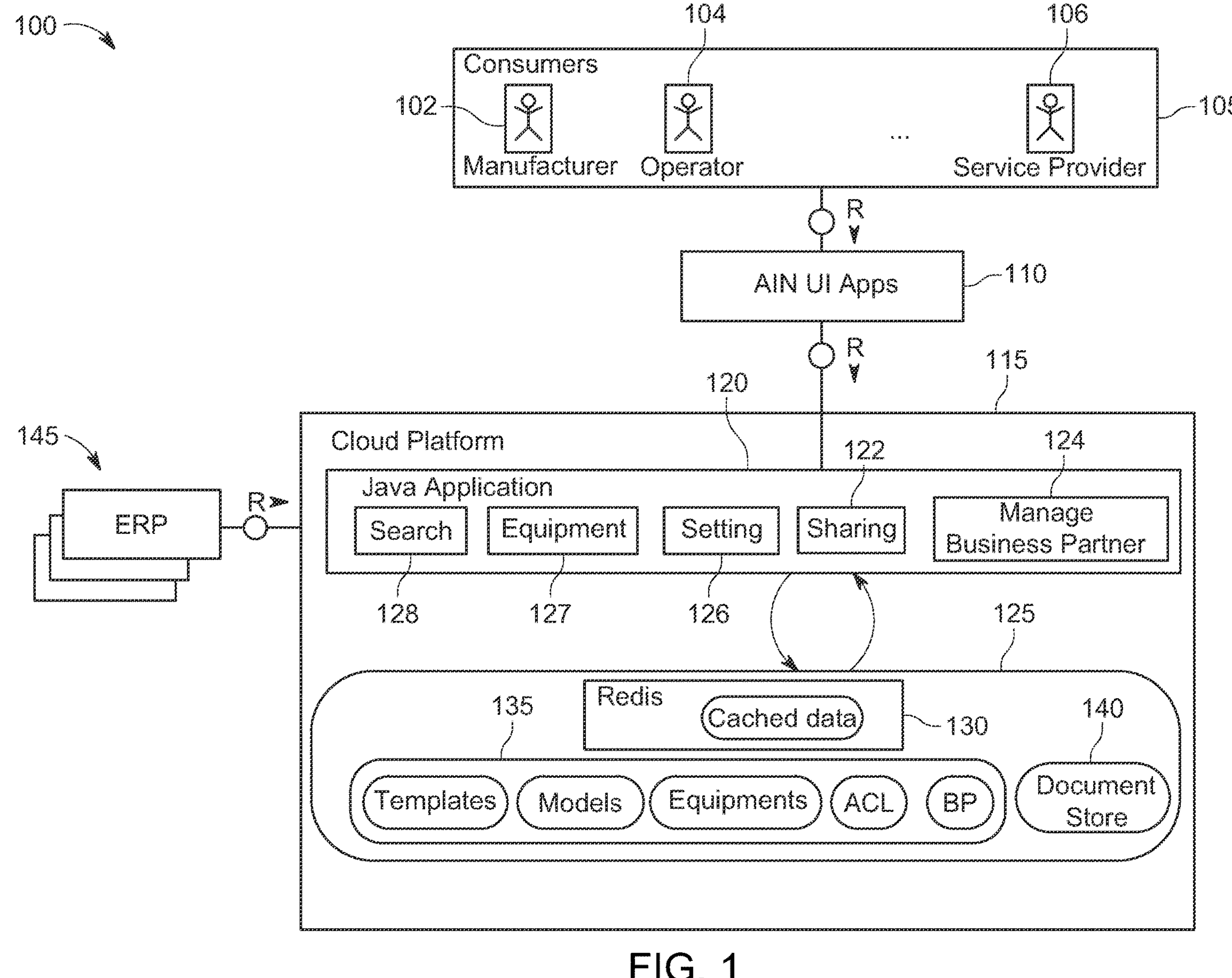
FIG. 1 is an illustrative depiction of a system architecture, according to an example embodiment.

The following description is provided to enable any person in the art to make and use the described embodiments. Various modifications, however, will remain readily apparent to those in the art.

In some aspects of the present disclosure, one embodiment includes a framework or architecture to integrate a plurality of different systems (e.g., on premise ERP (enterprise resource planning) systems, etc.) and services (e.g., cloud-based services) with an equipment management network to provide unified visibility and access to data of the different systems and services. In some aspects of the present disclosure, one embodiment includes a framework or architecture to efficiently and securely share data related to an object amongst multiple different systems and services associated with one or more entities, where the multiple different systems and services may be integrated with an equipment management network or other collaboration platform. In some embodiments, the collaboration platform may operate to provide unified visibility and access to data of the objects shared via the collaboration platform from the multiple different systems and services. In some aspects, an integrated network or collaboration platform herein may provide, via connected infrastructure, shared storage and access to data related to objects to be shared to or shared from the multiple different systems and services and otherwise accessed and processed via the collaboration platform.

Various aspects of one or more embodiments of the present disclosure may be illustrated by one or more example systems and processes. The one or more example systems and processes disclosed herein may be discussed with respect to one or more illustrative contexts. For instance, some aspects of the present disclosure will be discussed in the illustrative context of an asset or equipment of an industrial plant, wherein a manufacturer produces the equipment, an operator of an industrial plant operates and manages the maintenance of the different equipment (i.e., assets) of the plant, and service providers may perform services on the equipment at the request and/or direction of the operator to maintain and/or repair the equipment.

In some aspects, all relevant information related to an equipment might be digitized and comprise the entirety of the data managed by an integrated equipment management network herein. As used herein, an "object" or "data object" (used interchangeably sometimes herein) may refer to any aspect of data related to an equipment (or asset or other entity). For example, a manufacturer of an industrial asset or piece of equipment may create a digital twin (i.e., data representative of the equipment) corresponding to the real-world embodiment of the equipment. In some embodiments, objects associated with the equipment might include, but are not limited to, digitized models of the equipment (i.e., the digital twin), bill of materials for the equipment, design specifications for the equipment, operating instruction manuals for the equipment, maintenance schedules and procedures for the equipment, failure modes for the equipment, etc. A distinction between various objects related to a particular equipment may be indicated by an "object type", where the object type may specify whether the associated "object" is one of a digital twin, bill of materials, design specifications, operating instruction manual(s), maintenance procedure(s), failure modes, or other aspects related to the equipment.

As an illustrative example context where the systems and processes of sharing data objects in an integrated equipment management network disclosed herein may be useful, some aspects regarding the maintenance of the assets of an industrial plant by an operator of the plant will now be discussed. In some instances, in an effort to timely maintain the plant equipment, a n equipment manufacturer may want or need to share information regarding the equipment they manufacture with other entities, a plant operator may need to obtain information regarding the plant equipment and its associated documentation from one or more different equipment manufacturers of the plant equipment, as well as engage with one or more outside service providers that can service or otherwise support the maintenance of the plant's assets. The manufacturer may create data representative of the equipment (i.e., various objects) on their on-premise backend system(s) or a cloud platform or service providing such functionality (e.g., an ERP, enterprise resource planning, system). The operator may generate data associated with the equipment they operate in, for example, their various plants. In some instances, the manufacturer might have a different backend system, such as an on-premise backend system(s) or a cloud platform or service instance providing such functionality (e.g., an ERP, enterprise resource planning, system), to generate and manage the equipment they manufacture in different manufacturing facilities, where, for example, the data associated with the equipment of each manufacturing facility is managed by a different ERP system.

In some instances, an operator of the equipment may typically need to access at least some of the data (e.g., digital twin model(s), documentation, operating instructions, maintenance procedures, etc.) related to a particular asset that they operate within their plant to maintain and service the equipment. Likewise, the operator may generate data associated with the equipment they operate in, for example, their various plants. In some instances, the operator might have a different backend system, such as an on-premise backend system(s) or a cloud platform or service instance providing such functionality (e.g., an ERP, enterprise resource planning, system) for each of their plants.

In some embodiments, an equipment management network may be provided that might integrate with one or more on-premise backend system(s) or cloud based computing platform or service instances providing collaborative management, processing, and storage of data objects associated with equipment or assets. In some examples and contexts herein, the systems and services integrated with the equipment management network might include ERP systems and services, although the systems and processes herein are not limited to being ERP systems and services unless specifically stated as being so limited.

However, one impediment to having the entities (e.g., the operator, manufacturers, and service providers) efficiently collaborate and share equipment related data in an efficient and reliable manner in an equipment management network may be the absence of an efficient and accurate process to replicate data objects from multiple different ERP (or other) systems and services for sharing to and from the integrated equipment management network. For example, an equipment manufacturer might have upwards of millions of data objects associated with their equipment that is produced in multiple facilities or plants, where the data objects are generated, managed, and stored by multiple different ERP systems and services corresponding to each of the different manufacturing facilities. While the equipment management network might be configured to integrate or otherwise exchange information with the multiple different ERP systems and services of the manufacturer, there remains a need to efficiently replicate the data objects from the manufacturer's multiple different ERP systems and services to the equipment management network so that, for example, the manufacturer need not recreate each of their data objects anew in the equipment management network and the data objects in the manufacturer's (or other entities') ERP systems are fully and accurately correlated with the replicated objects in the equipment management network and other ERP (or other) systems integrated therewith.

FIG. 1 is an illustrative depiction of an overall system architecture 100, according to an example embodiment. Continuing the example of sharing equipment associated data objects, FIG. 1 is an illustrative system architecture 100 that might be utilized to share and replicate different data objects (also referred to as objects herein) related to an equipment amongst different entities 105 having access to an equipment management network 115 such that data objects from ERP systems or services 145 associated with a manufacturer 102 (or another owner of a data object such as operator 104 and service provider 106) may efficiently replicate the data objects in the equipment management network 115. In some aspects, equipment management network 115 provides a mechanism for manufacturer 102 (or another owner of a data object) to replicate and share data objects, via the equipment management network. For example, manufacturer 102 (or another entity owner of a data object) may replicate their data object(s) to equipment management network 115 and the equipment management network might have data objects therein, whether created by the equipment management network 115 or by the different entities 105, replicated to one or more of the ERP systems or services 145 integrated with the equipment management network 115. In some embodiments, equipment management network 115 may operate as a central repository for all of the data objects from the different ERP systems or services 145. In such embodiments, entities 105 may have access and visibility to all of the equipment related data objects via equipment management network 115. In some aspects, a data object replicated in the equipment management network 115 may have a (unique) identifier therein. Moreover, the identifier assigned to the data object in the equipment management network 115 may be correlated to the corresponding same data object (e.g., document, spare part, etc.) in one or more of the ERP systems or services 145, where the ERP systems or services 145 assign an external ID to data objects therein, and the equipment management network 115 maintains a record correlating the (unique) identifier of the equipment management network 115 with the external IDs of the ERP systems or services 145 for each of the replicated data objects.

In some aspects, equipment management network 115 provides visibility to the data objects stored, managed, and shared thereby. In some instances, an owner of a data object (e.g., manufacturer 102) accessing a data object shared by the equipment management network may be presented, via a user interface, a view of, for example, all of their ERP systems' data objects and the identifier correlated with the data objects in the of the equipment management network.

Equipment management network 115 further includes cloud-based collaboration application 120 that includes application or service 124 for managing business partners or entities such as creating connections between different entities and organizing entities into groups; sharing application, service, or functionality 122 for specifying and managing the access rights (e.g., read access right, write access right) and sharing rights associated with an object; a setting application or service 126 for adding and configuring external ERP (or other) systems integrated with equipment management network (as will be disclosed in greater detail below); configuring equipment (or other data object types) in the equipment management network via equipment application or service 127, and searching the data objects over the equipment management network and the multiple ERP systems 145 using search application or service 128.

Referring still to FIG. 1, a manufacturer might generate or otherwise own data objects related to an asset or equipment in an ERP system 145. The data objects may be replicated and transmitted to equipment management network 115 that is configured to, for example, manage and store the data objects in a data storage facility 125. In some embodiments, the data objects may include one or more different types of objects, including, but not limited to, equipment, models, templates, etc. In some embodiments, objects having an object type of a "document" (e.g., operating manuals, instructions manuals, assembly manuals, schematics, etc.) might be stored in a document store 140, which may be particularly configured to efficiently store, index, and mange documents (e.g., structured documents, unstructured documents, etc.). In one embodiment, data storage facility 125 may include or integrate a cached data service 130 for storing data in a fast in-memory data store. Data objects managed and stored in data storage device, facility, or service 125 provides shared access to such data with the entities (e.g., the manufacturer, operator, service providers, service provider contractors and subcontractors, etc.) that may provide information to the collaboration service or application 120 or otherwise be provided access privileges to the data thereof.

In some aspects, the data objects owned by the manufacturer (or other creator/owner thereof) and replicated from ERP systems 145 to equipment management network 115, may be consumed or otherwise accessed by users 105. Users 105 may access equipment management network 115 via one or more user interface (UI) applications 110. In some instances, communication between systems and devices of users 105 may be facilitated by an application programming interface (API) call. In some instances, the API may be provided by the equipment management network. In some embodiments, data objects newly created or updated in the ERP systems 145 may be automatically replicated in the equipment management network 115 via an API call using an API provided by the equipment management network (or other communication protocols or techniques), in response to the creation or updating of the data object that includes an indication of an external ID generated by the ERP systems 145 and associated with the particular data object. The created or updated data object might then be accessed by and shared with one or more of the users 105 via the equipment management network 115. Likewise, in some embodiments data objects newly created or updated in the equipment management network 115 may be automatically replicated in the ERP systems 145 via an API call (or other communication protocols or techniques), in response to the creation or updating of the data object, where the data object created or updated by the equipment management network 115 is assigned a (unique) identifier by the equipment management network 115.

In some aspects, the present disclosure provides a mechanism to connect a multiple number (e.g., N) of ERP (or other) systems or service instances to each other via an equipment management network integrated to the ERP systems or service instances.

Figure 2:
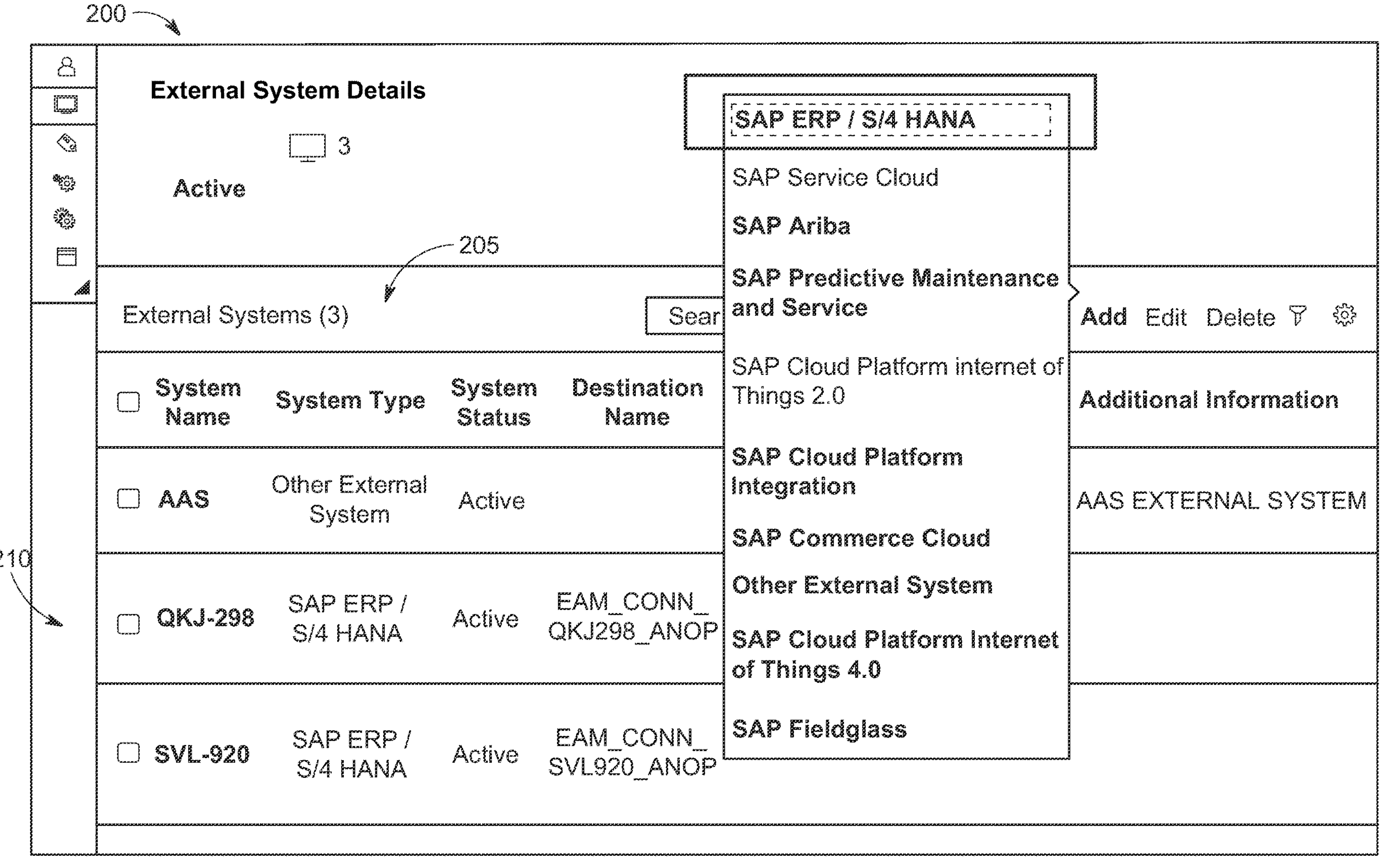
FIG. 2 is an illustrative outward facing user interface for configuring a service in an equipment management network, according to an example embodiment.

FIG. 2 is an illustrative outward facing user interface 200 for configuring a service (e.g., an ERP system or cloud based service) in an equipment management network, according to an example embodiment. In the example of FIG. 2, a tenant (e.g., an operator) may be logged into the equipment management network. The equipment management network provides and supports adding external ERP systems and services to the equipment management network. As illustrated, the operator maintains three (3) external ERP systems as indicated at 205 and further listed at 210. In the present example, the three external ERP systems that are integrated or otherwise configured to communicate and share information with the equipment management network.

FIG. 3 is an illustrative outward facing user interface 300 for an entity to define a service in an equipment management network, according to an example embodiment. As shown, UI 300 provides an interface for a user to define their ERP system(s) being added to the equipment management network by entering specific details and characteristics of the ERP systems. In the example of FIG. 3, such details might include an ERP system name, client ID, system status, and a destination name so that updates, messages, and notifications may be sent to the proper backend ERP system.

Figure 4:
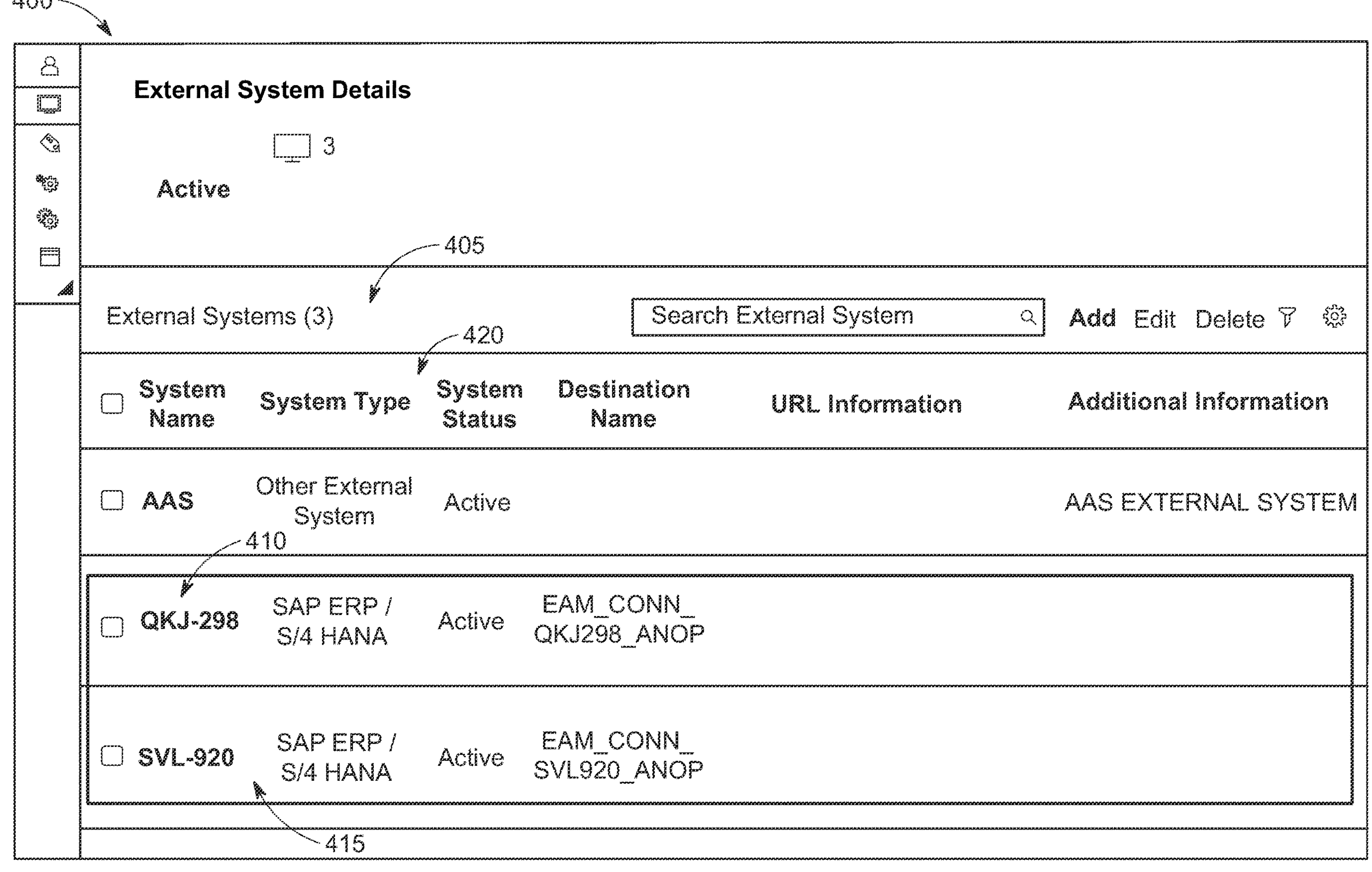
FIG. 4 is an illustrative outward facing user interface presenting a view of multiple services configured in an equipment management network, according to an example embodiment.

FIG. 4 is an illustrative outward facing user interface 400 presenting a view of multiple services configured in an equipment management network, according to an example embodiment. In this example, three (3) external systems 405 have been defined and added to the equipment management network, where two (2) of the systems 410 and 415 are external ERP systems as indicated by the "System Type" at 420.

In some instances, numerous data objects (i.e., objects) associated with equipment may be maintained and managed by the ERP systems and services added to the equipment management network (e.g., per the systems and operations disclosed in FIGS. 1-4). As discussed above, entity users of the ERP systems and services may want to have the data objects associated with equipment from their multiple ERP systems and services replicated in the equipment management network integrated with their ERP systems. Accordingly, in some embodiments an equipment management network herein might be configured to provide a mechanism to replicate or otherwise create objects from the different ERP systems and services integrated therewith.

Figure 5:
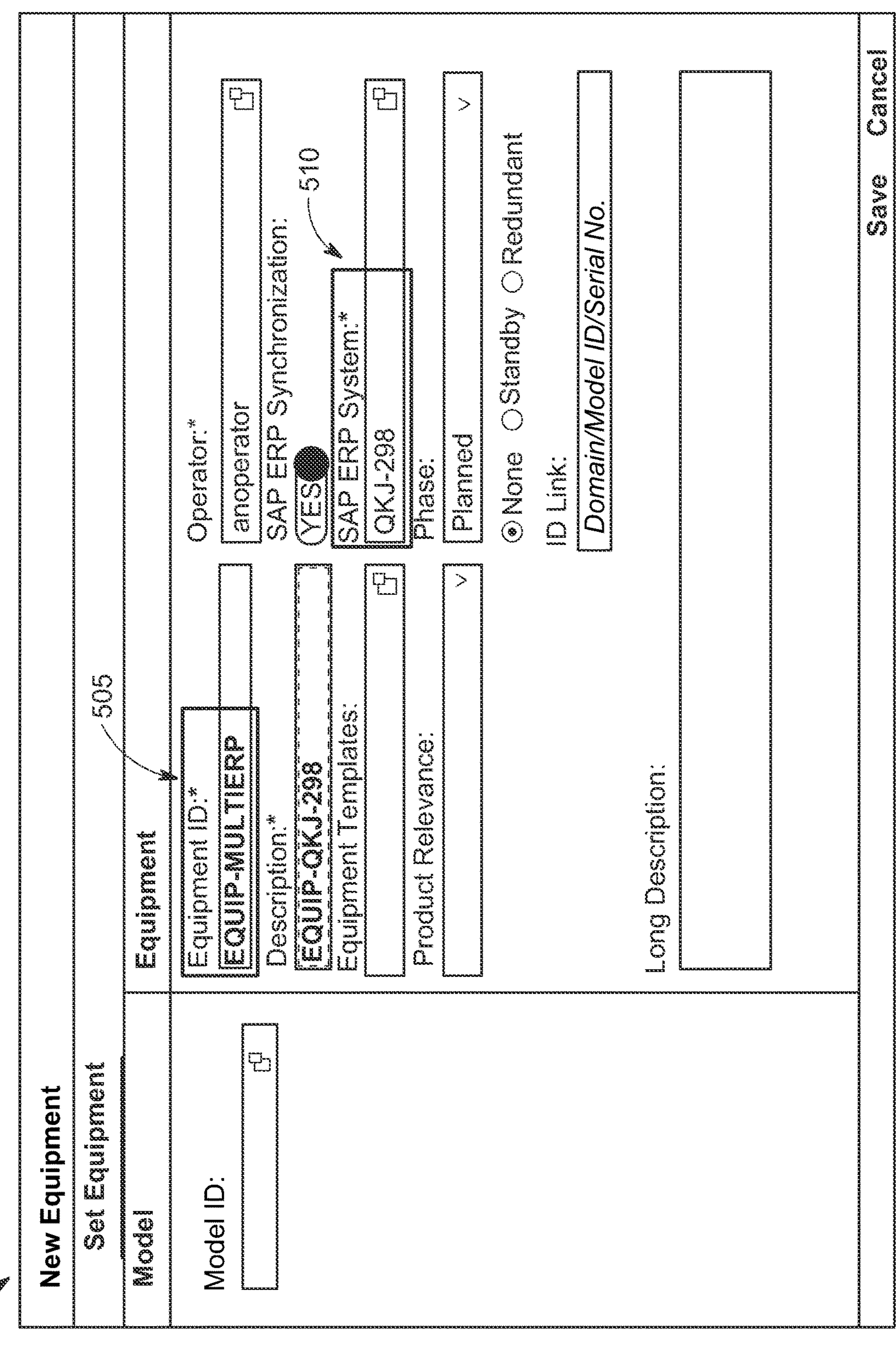
FIG. 5 is an illustrative process flow, according to an example embodiment.

FIG. 5 is an illustrative outward facing user interface 500 presenting a view of services integrated with an equipment management network, according to an example embodiment. In the example of FIG. 5, the subject tenant has a multi-ERP configuration (e.g., two (2) ERPs, "QKJ-298" and "SVL-920" from FIG. 4). UI 500 provides an interface for creating a new equipment 505 in the equipment management network for the ERP system specified at 510. During the creation of the data object associated with the equipment, the ERP system associated with the equipment is specified so that the data object can be replicated to the appropriate ERP system. By specifying the particular ERP system the created equipment (i.e., data object) belongs to, the equipment management network can avoid sending the data object to nonrelevant ERP systems and services. In this manner, the disclosed systems herein might avoid sending or pushing "junk" data to other ERP systems when there is no known reason for that those other ERP systems to have a reference for this particular data object.

In some embodiments, when an equipment (i.e., data object) is created in the equipment management network, an event may be created that automatically pushes this event to the ERP systems or services specified as being associated with the data object. The event informs the ERP system that the equipment, including a (unique) ID associated with equipment in the equipment management network, has been created is relevant to the ERP system.

In some embodiments, a "listener" type of application, service, or functionality may be configured or otherwise implemented in the integrated ERP systems and services such that the ERP systems and services may monitor whether there is an event regarding, for example, equipment creation that indicates a new equipment has been created in the equipment management network that should be replicated back in the respective ERP system.

In some embodiments, using public APIs and using the event information including the equipment ID from the equipment management network, the ERP system receiving an event notification will recreate or otherwise replicate that equipment in the ERP system. The equipment associated data object created in the equipment management network is assigned an identifier in the equipment management network. When the data object is recreated or replicated in the ERP system, it is assigned an external ID generated by the ERP system (e.g., based upon a number range or other naming scheme within the ERP system).

FIG. 6 is an illustrative outward facing user interface 600 presenting a view of an external ID associated with a data object, according to an example embodiment. In the example of FIG. 6, the external ID shown at 605 was assigned to the equipment by the external ERP system "QKJ-298" listed at 610 when the equipment was replicated to the ERP system.

In this manner, for any object that gets replicated into equipment management network or any object that is created in the equipment management network that gets replicated back to an ERP system (e.g., FIGS. 5 and 6), the equipment management network maintains a record of information in the form of, for example, the external ID that indicates the particular equipment data object in equipment management network has a corresponding reference ID in the external ERP system.

Figure 7:
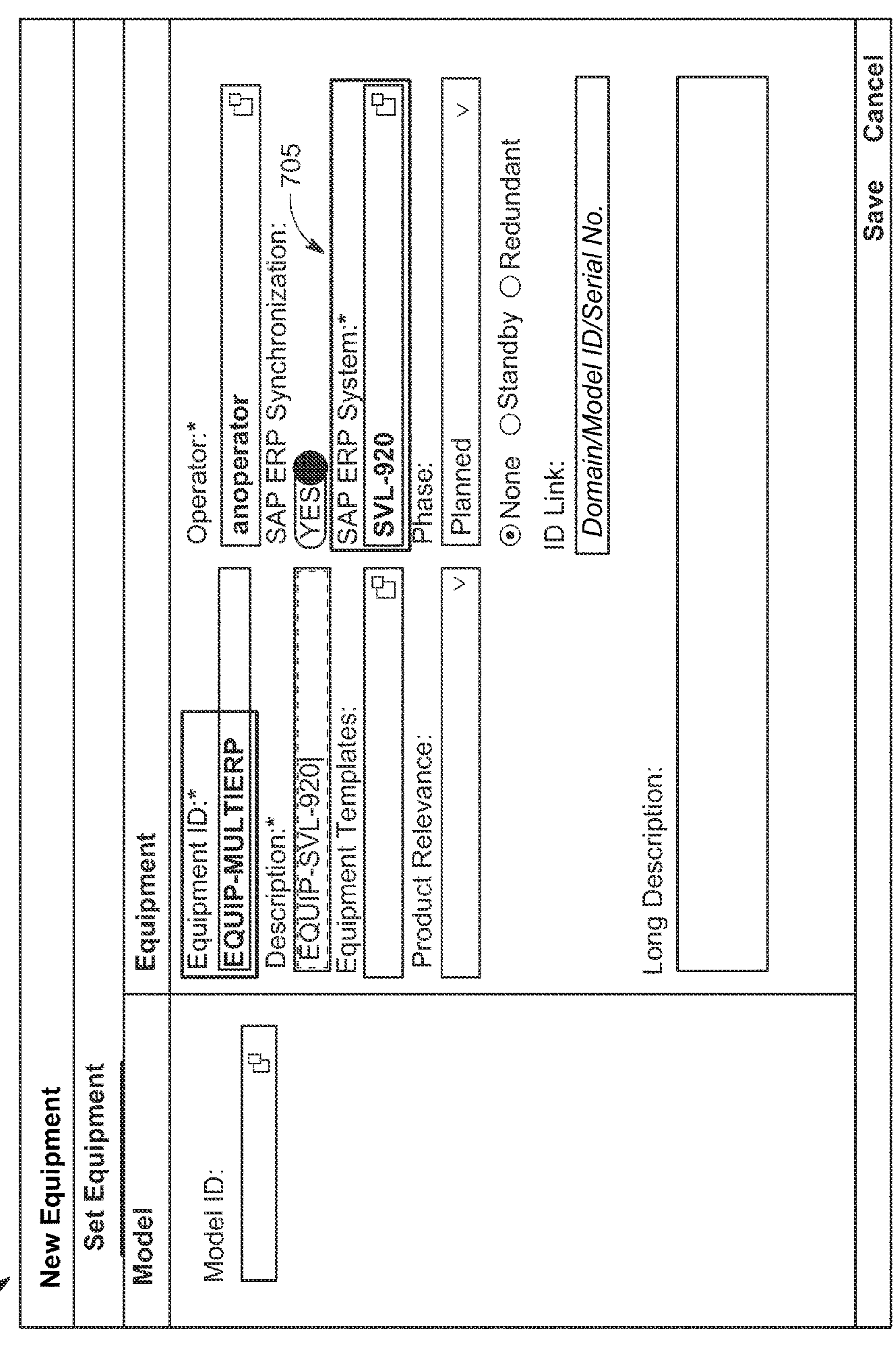
FIG. 7 is an illustrative outward facing user interface presenting a view of service integrated with an equipment management network, according to an example embodiment.

FIGS. 7 and 8 are similar to FIGS. 5 and 6, except the equipment data object created in the equipment management network is associated with the external ERP system "SVL-920". FIG. 7 is an illustrative outward facing user 700 interface presenting a view wherein the ERP service "SVL-920" integrated with the equipment management network is specified at 705. FIG. 8 includes an illustrative outward facing user interface 800 presenting a view of the external ID 805 associated with and assigned to the equipment data object when the data object was replicated in the ERP system. For example, after the equipment is created in the equipment management network as defined in FIG. 7, an event regarding the creation of the equipment is transmitted to the relevant ERP system 705 that is configured to listen for such events. The ERP system 705 responds to the event notification by processing the event, including replicating the equipment data object created in the equipment management network. Once the equipment data object is successfully created in ERP system 705 with an external ID, the external ID associated with the data objected replicated by the ERP system is provided to the equipment management network system. FIG. 8 is an illustrative outward facing user interface 800 presenting a view of an external ID 805 that was assigned to the equipment by the external ERP system "SVL-920" and depicted at 810 when the equipment was replicated to the ERP system.

FIG. 9 is an illustrative process flow 900 related to an example embodiment. In particular, process 900 relates to a creation and replication of a data object that might be processed by an equipment management network integrated with multiple external systems or services. At operation 905, a representation of a data object associated with an equipment in an equipment management network is generated. In some embodiments, the generating of the data object includes creating and associating a first identifier for the data object in the equipment management network, where the first identifier may be used as a reference or pointer to the data object with which it is associated. The generating of the data object may further include or trigger the specifying of a first service integrated with the equipment management network to associate with the object. For example, the first service integrated with the equipment management network may be a particular ERP system or service of an entity (e.g., a manufacturer, operator, or other entity having data managed by one or more ERP (or other) systems).

At operation 910, an event notification may be automatically transmitted from the equipment management network to the first service. The event notification may be transmitted to the first service in response to the generating or creation of the object by the equipment management network at operation 905. In some aspects, the event notification may be transmitted to the first service to inform the first service of the creation of the object in the equipment management network. In some embodiments, the equipment management network may determine the event notification should be sent to the first service based on, at least in part, the first service as specified in operation 905.

At operation 915, an indication of an external identifier associated with a replication of the object in the first service may be received by the equipment management network from the first service. For example, in some embodiments the first service might replicate or recreate the object in the first service in reply to receiving the event notification transmitted from the equipment management network, in operation 910. The first service may further send the indication of the external identifier, generated by the first service and associated with the data object replicated in the first service, to the equipment management network.

Continuing to operation 920, the equipment management network may execute to correlate the first identifier associated with the object in the equipment management network (e.g., an object ID) with the external identifier associated with the replication of the object in the first service (e.g., an external ID). In some aspects, the first identifier associated with the object in the equipment management network may be unique and associated with a singular data object.

At operation 925, a record of the correlation of the first identifier of the object in the equipment management network and the external identifier of the object in the first service may be stored in a data store of the equipment management network. In some embodiments, the record of the correlation might be maintained by the equipment management network so that, for example, the equipment management network is aware of the data object in the first service (as well as other services and systems integrated with the equipment management network).

Figure 10:
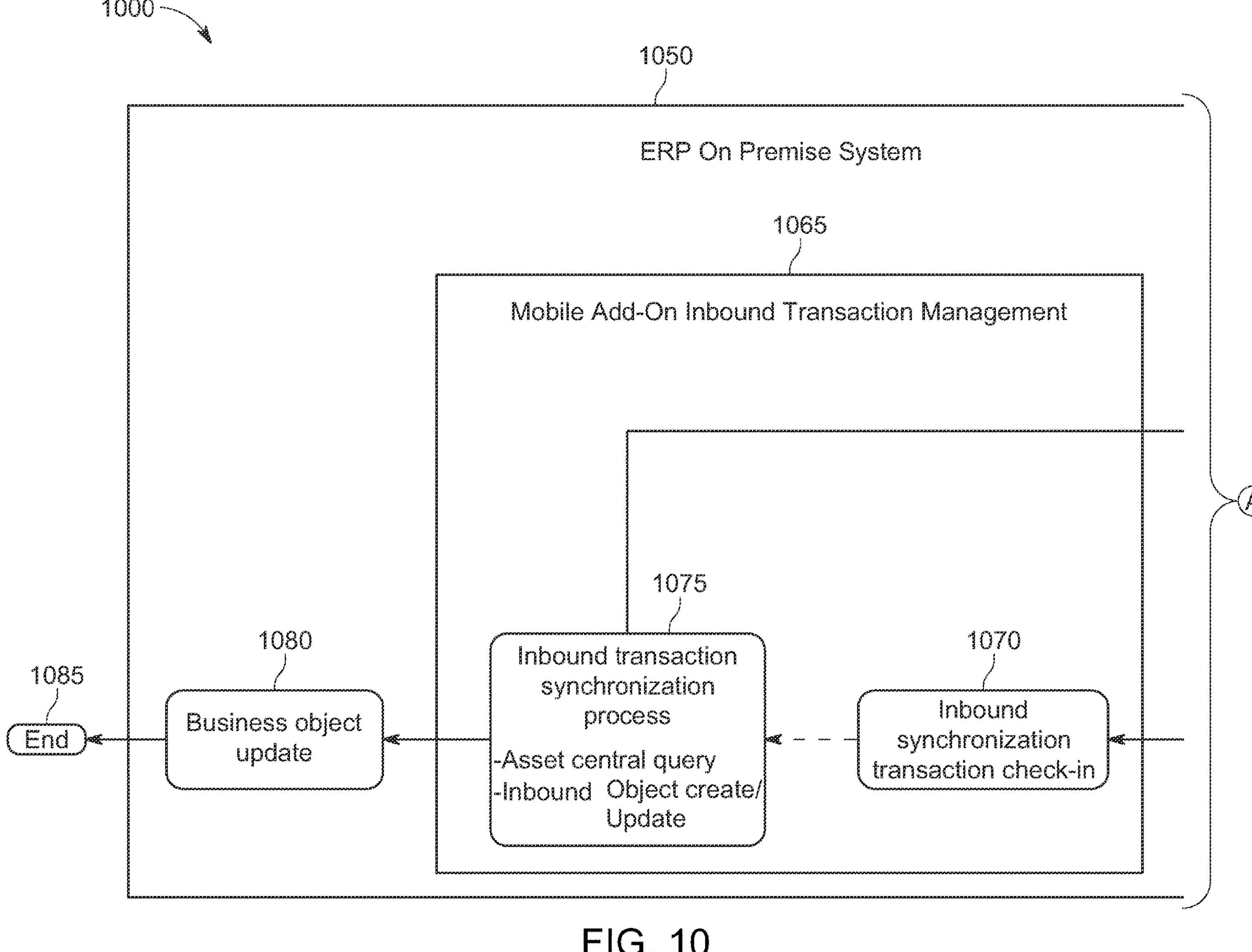
FIG. 10 is an illustrative outward facing user interface presenting a view of an external ID associated with a data object, according to some example embodiments.
Figure 10:
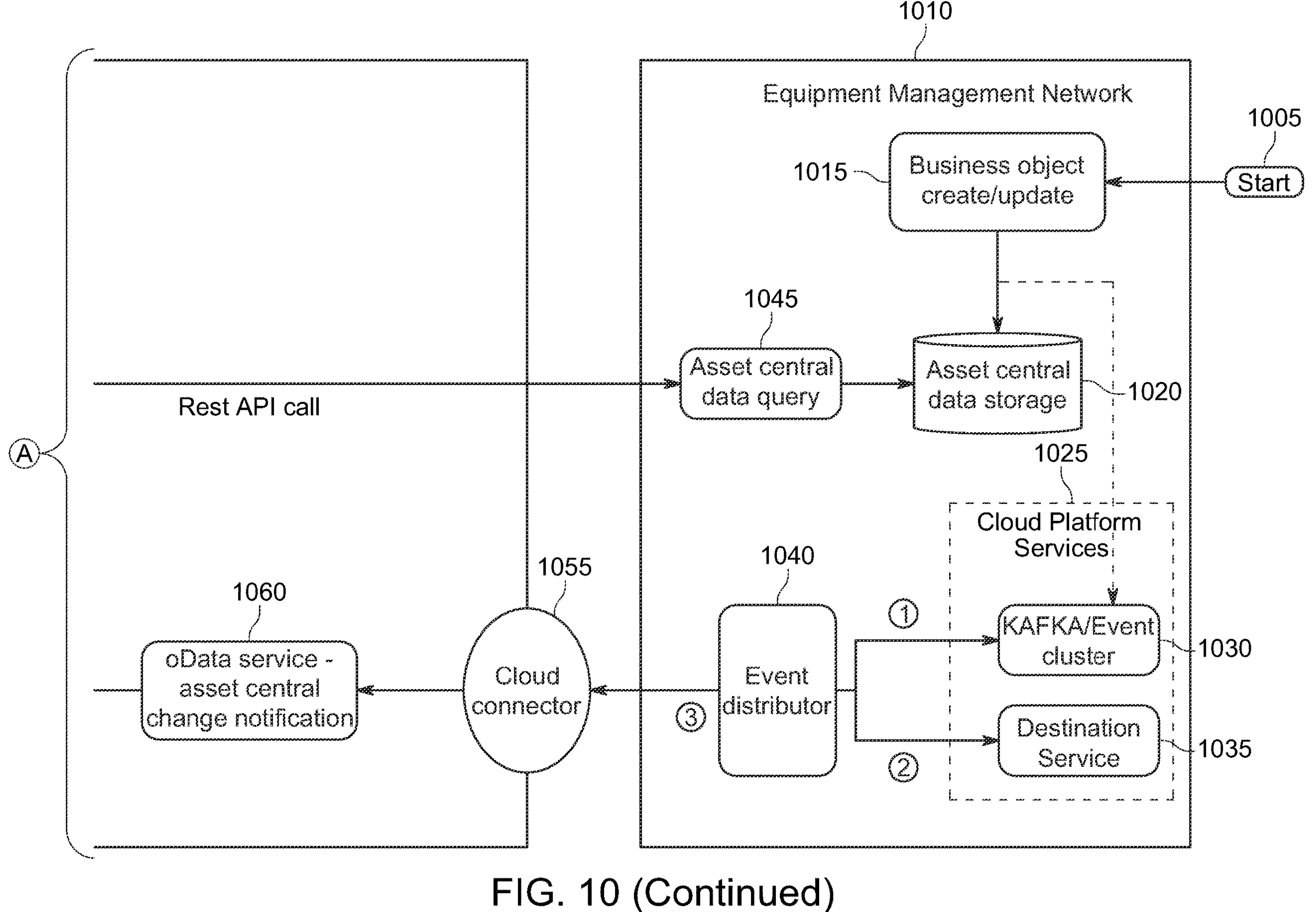

FIG. 10 discloses an exemplary inbound flow from an equipment management network to an ERP system or service integrated therewith. Starting at 1005, changes may be made to create or update an object in the equipment management network as indicated by component or service 1015 that processes the creation and updating of data objects. The created or updated object may be stored in a data store instance or data storage management system 1020. Additionally, in response to the creation or updating of the data object, cloud platform services 1025 may be configured to raise a (Kafka) event at 1030 regarding the change, update, or creation of the data object at 1015. In some embodiment, the event might include details such as, for example, what object is created or updated, external IDs associated with the object, information regarding an object type (e.g., equipment, a work order, maintenance notification, maintenance work order, maintenance confirmation, functional location, a document, a template, attribute, etc.), and an object ID for the corresponding object in the equipment management network 1010. Destination service 1035 may determine destination(s) for the data object based on, for example, the destination(s) specified in association with the data object when the data object is created. An event distributor 1040 may operate to read the ERP destination information from destination service 1035, wherein the event distributor may enhance the event and inform the equipment management network that the data object is to be sent to certain, one or more specific ERP systems or services. For example, in an instance a data object (e.g., an equipment, a document, etc.) updated at 1010 has two external IDs, then an event notification will be sent to the two ERP systems corresponding to the two specified external IDs. Furthermore, the event distributor may, based upon the determined destinations, and facilitated by the cloud connectors 1055 maintained with the ERP system(s) 1050, push the event to the specified, corresponding ERP systems 1050. Note that while FIG. 10 illustrates one ERP system at 1050, there may be multiple different ERP systems as disclosed throughout the present disclosure. One ERP system is shown at 1050 in FIG. 10 for reasons related to clarity of the drawing, as opposed to any limitation on the system 1000.

In some embodiments, if an equipment created at 1015 has references (e.g., associated external IDs) to two ERP systems belonging to two different entities or customers, then event distributor 1040 may push the event back to the cloud connector(s) 1055 of the respective organizations' ERP systems. In some aspects, the event distributor may determine which systems and services, whether multiple ERPs of a single user or multiple ERP systems belonging to different user entities, a particular event is to be sent/transmit to and may use the appropriate cloud connector(s) 1055 to ensure the event is pushed to the appropriated ERP system(s).

In some embodiments, ERP system 1050 might implement a "listener" type of service where change notification services 1060 will receive all of the event notifications. An inbound transaction management service or device 1065 functions to receive the event notifications at 1070 and process the changes of the event notifications, including an inbound transaction synchronization process 1075 to deserialize the events to determine what event has been sent, including for example to determine whether the event is associated with an equipment, a functional location, etc. (i.e., the event type). In some aspects, the equipment management network maintains at data store 1020 a mapping table or the like for every object that is replicated into the equipment management network 1010, where the external ID belonging to the ERP system(s) as well as the corresponding equipment management network system reference number or object ID is (securely) maintained. Based on the determined event type and the associated equipment management network or object ID included in the event notification, a query 1045 is run against data store 1020 of the equipment management network identified by the object ID to obtain the particular data object changes related to the event notification. The particular data object changes (i.e., query results) are then sent to the ERP. Accordingly, the ERP system knows, based on the event information (e.g., event type), which data object(s) should be updated on the ERP side. The ERP system may then make the changes at 1080 on the ERP side. In this manner, changes (e.g., data object creation or updated) that occur to a particular object in the equipment management network 1010 can be replicated to one or more ERP systems of a same customer or replicated one or more ERP systems of one customer or one or more ERP systems of various customers. The process can then end at 1085.

In some aspects, every customer or every entity having ERP (or other) systems integrated to an equipment management network herein might be able to view the events since, for example, a data record of the events can be maintained by the equipment management network. In some instances, an entity might build a dashboard type of tool or service based on stored event data. In one use case, rather than automatically updating a data object by default in response to an event notification that the data object has changed, a customer might create a workflow using custom implementations. For example, in response to an event notification of an update to a data object in the equipment management network, instead of automatically updating the data in their ERP system, the user might have a particular workflow executed first before the updates to the data in the ERP are performed.

In some regards, a user of an integrated equipment management network herein may be provided with access to information that can be used in a varied and flexible manner to suit their needs. In some aspects, all of the events created may be accurately and securely documented and maintained in a memory, including for example, what kind of events are being sent to the customers, what each event comprises, the structure of the events, the details regarding the event, etc. so that a user might, for example, build their own applications based upon, for example, the change events that the equipment management network sends to their respective ERP systems.

Figure 11:
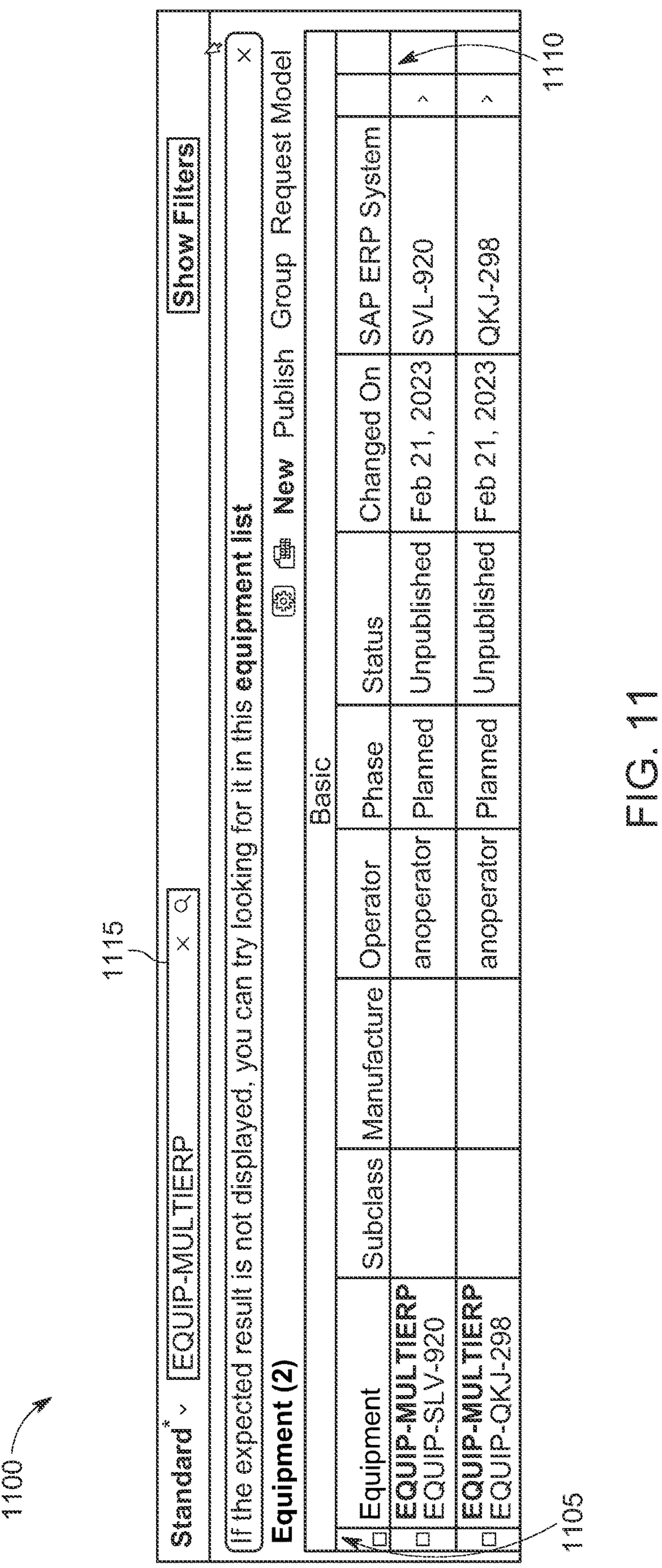
FIG. 11 is an illustrative outward facing user interface related to a query of an equipment management network, according to an example embodiment.

In some aspects, an equipment management network herein may be integrated with one or more ERP (or other) systems. In some embodiments, an integrated equipment management network herein may maintain in a memory (e.g., FIG. 1, 125; FIG. 10, 1020; and FIG. 13, 1360) a record, data table, or other data structure representation of data objects, including an object ID for each data object in the equipment management network, a corresponding external reference ID for each respective data object in an associated ERP system or service connected with the equipment management network, the original owner of the data object (e.g., equipment, etc.), an indication of other ERP system(s) the data object has been shared, an indication of other ERP system(s) the data object should be shared with, etc. For example, an equipment management network (e.g., FIG. 1) herein may integrate ten (10) or more ERP systems corresponding to ten (10) or more assembly plants of an equipment manufacturer, where millions of different equipment are replicated from the different ERP systems to the equipment management network. In accordance with the present disclosure, the equipment management network may maintain, in a centralized or distributed data storage facility, an updated and accurate representation of the various data objects in the equipment management network, including for example, the one or more ERP system(s) associated with each data object so that, for example, changes to data objects in the equipment management network can be reliably and efficiently replicated to the relevant ERP systems as disclosed herein (e.g., the processes of FIG. 10). In some instances, reports, visualizations, and other data analytics related outputs may be generated based on the repository of data object information maintained by the equipment management network. In some embodiments, an equipment management network herein might be configured, via a search application, service, or other functionality thereof (e.g., FIG. 1, 128) to visualize, search, and filter on one or more of the data objects from the multiple ERP systems and services integrated with the equipment management network. In some embodiments, FIG. 11 is an illustrative depiction of a UI 1100 that presents a display of a standard global report. UI 1100 provides a mechanism to visualize, in one location, a presentation (e.g., a listing, etc.) of all of the equipment (or other data object types) 1105 from the multiple ERP systems 1110. For example, a customer of an equipment management network service might access UI 100 via their equipment management network tenant. UI 1100 further provides a mechanism to search the data objects of the integrated equipment management network using the search bar 1115.

Figure 12:
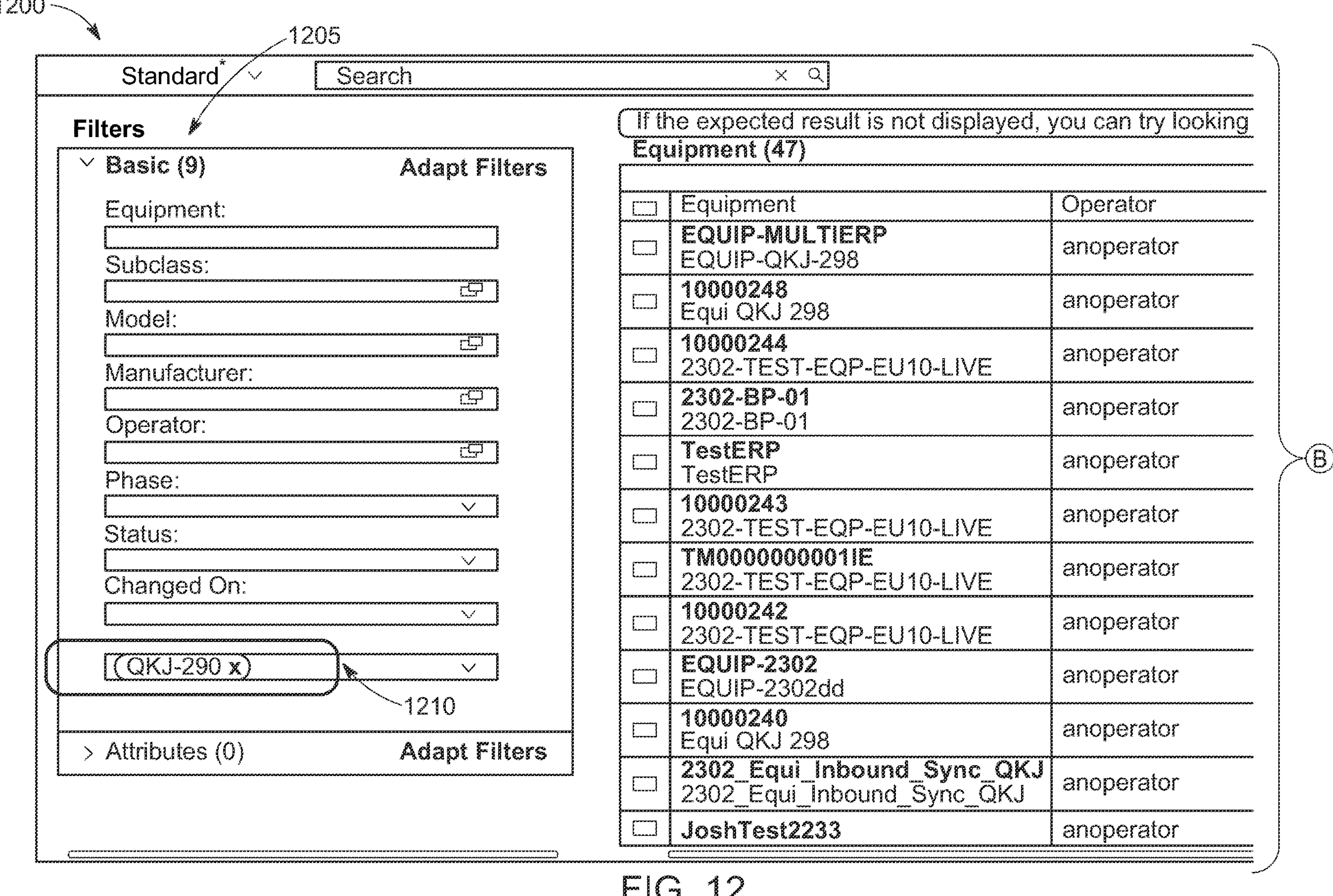
FIG. 12 is an illustrative outward facing user interface related to filtering a query of an equipment management network, according to an example embodiment.

FIG. 12 is an illustrative outward facing user interface 1200 related to filtering a query of an equipment management network, according to an example embodiment. UI 1200 includes numerous filters 1205, where the fields of the filters may be populated to filter search results based on a number of different criteria. For example, an external ERP (or other) system may be submitted in the “External System” filter at 1210. In the example of FIG. 12, the search results are being filtered based on the specified ERP system “QKJ-298” for data objects associated with this particular, external system. In this example, data objects having references to ERP “QKJ-298” may be included in the search results, wherein data objects referencing other ERPs will be excluded from the search results. A listing of all of the ERP systems connected to/integrated with the equipment management network is provided at 1215.

Figure 13:
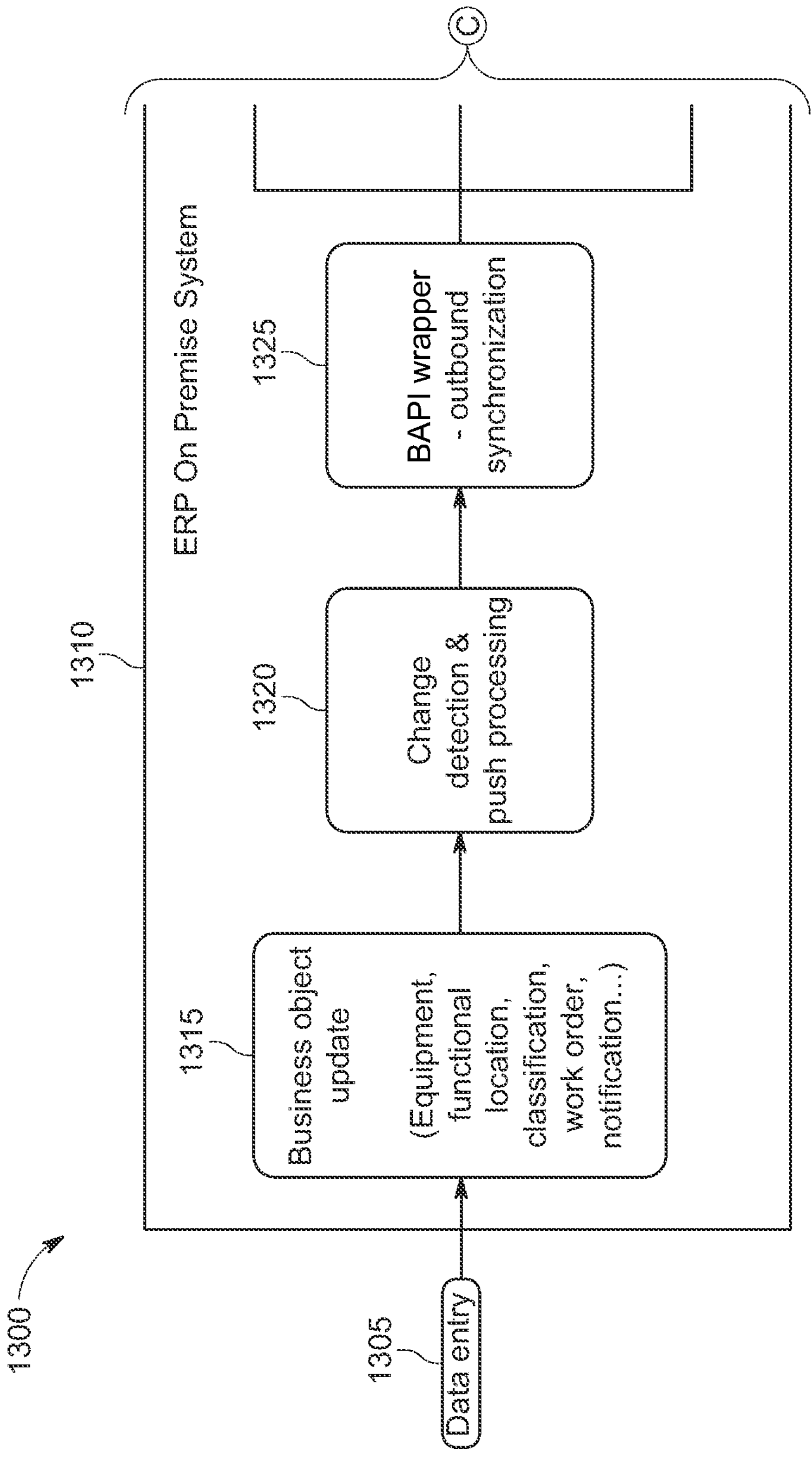
FIG. 13 is an illustrative outbound process flow related to an equipment management network, according to an example embodiment.
Figure 13:
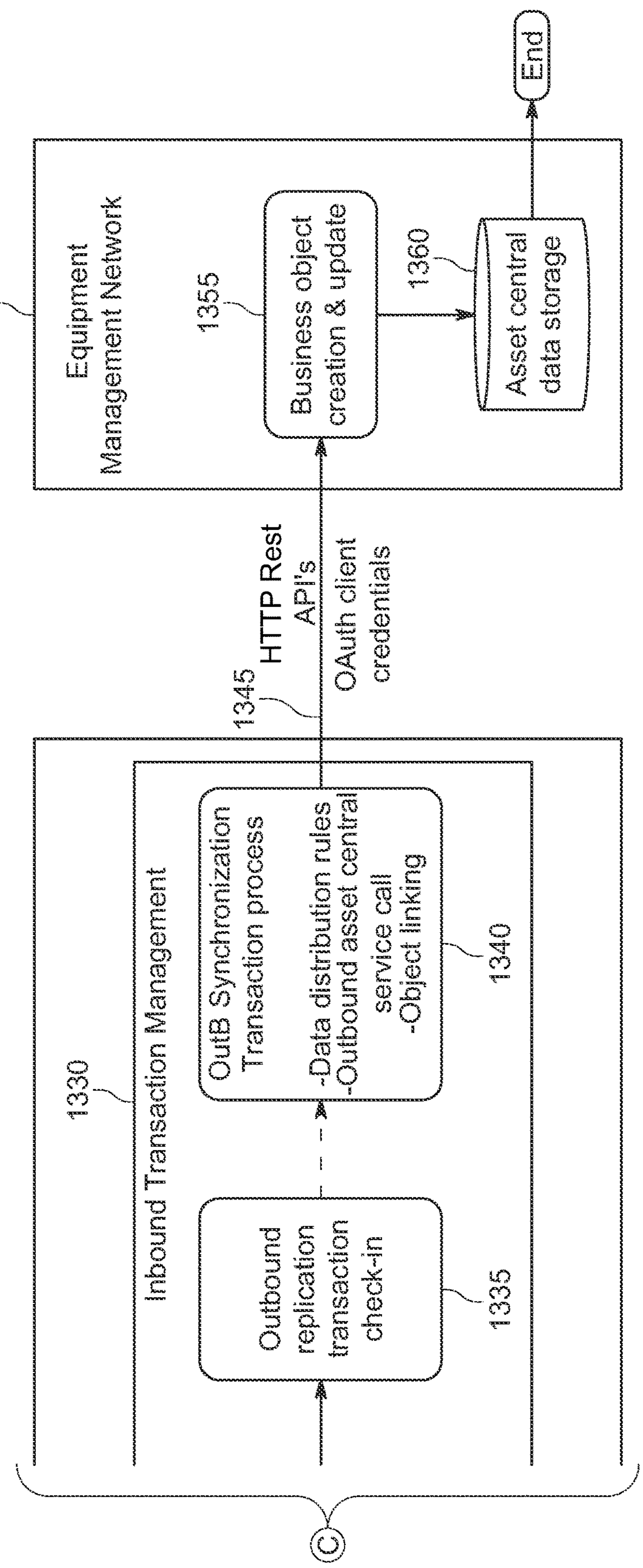

FIG. 13 is an illustrative outbound process flow 1300 related to an equipment management network, according to an example embodiment. For illustrative context in one example, there may be plant maintenance solutions that customers have been using for many years (e.g., decades) and have created millions of equipment in their respective ERP systems. Now, these customers might want to replicate their equipment associated data objects in the equipment management networks disclosed herein so that, for example, the data objects can be shared amongst some of the various users thereof. In this example, an outbound flow of data object information from ERP system or service 1310 to the equipment management network 1350 demonstrates how the data may be transferred. Starting with data entries at 1305, a new equipment is created or an existing equipment, functional location, classification, work order, notification, or any other type of data object associated with the plants and the tenant is updated in the tenant's ERP system at 1315. At 1320, data changes (e.g., data object creation or updates) are detected and push processing is executed, where the ERP system determines an event or the change/update that should be pushed to the equipment management network 1350 based on the detected changes. The requisite information (e.g., correlated ERP system IDs and equipment management network object IDs, destinations, etc.) is configured for synchronization by the outbound synchronization component at 1325. Continuing with this example, inbound transaction management system or service 1330 may use this event information, including, for example, configuration details from the ERP system such as the equipment management network destination, etc. The ERP system 1310 maintains the inbound transaction management at 1330. The event notification is received by the outbound replication transaction process or service 1335 that determines whether the event notification is to be pushed to the cloud and outbound synchronization transaction process or service 1340 transforms the event notification data (e.g., deserializes the event notification data, etc.) and generates and an API call that is sent to the equipment management network 1350 using APIs provided by the equipment management network. In some embodiments, a HTTP rest API call 1345 sending the information created at 1315 will be sent to the equipment management network 1350. The equipment associated data object changes (e.g., data object creation and updates) received by equipment management network 1350 are replicated by object creation and update process 1355. Process 1355 may further include generating and assigning an object ID to the replicated data object. The object ID assigned to the replicated data object is associated with the external reference ID assigned to the data object by ERP system 1310. A record of the replicated data object, including the object ID of the equipment management network and the corresponding external ID of the ERP system is stored at data storage facility 1360. Accordingly, ERP system 1310 may maintain its equipment associated with the change(s) and the equipment management network will also have a reference to the changed equipment data object via the external ID from the ERP system that corresponds to the equipment management network's object ID. In this manner, both the ERP system 1310 and the equipment management network 1350 can have an accurate and up-to-date understanding of how the reference numbers/IDs for the data object change(s) are correlated and correspond to each other. In some aspects, both the ERP system and the equipment management network will know how the object is correlated or linked in their respective system(s). In this manner, when a data object is updated, the changes can be replicated on the equipment management network side using the data provided from the ERP systems and using the external IDs correlated to the equipment management network's object ID(s).

Illustrative of how the systems and processes disclosed herein may be useful in processing and managing object types other than the example equipment data object types, a template object type will now be discussed wherein the template data object types might be created, processed, and replicated similar to the equipment data object types. For example, a temple data object may be synchronized from multiple ERP systems and service instances to an equipment management network and an external ID from each ERP system so that the template data object can be visible on, for example, a template object page within the equipment management network. As an example, many, if not most, characteristics for an asset or equipment (e.g., a particular model of an automobile produced by a manufacturer) may be the same, notwithstanding the fact that the particular model of automobile is produced at numerous different plants in different countries where each plant might have its own respective ERP system. As such, the particular model may be viewed as a "class" of automobile irrespective of a particular instance of the car, where all instances of this particular model of the automobile share a vast majority of common characteristics. As such, all instances of this particular model of automobile might belong to the same class of automobile for the manufacturer. In one example, a single class (i.e., template) may be created in one ERP system that can then be replicated to the equipment management network and where there are two references for two different ERP systems (e.g., ERP systems corresponding to two (2) different manufacturing plants) associated with the class.

Figure 15:
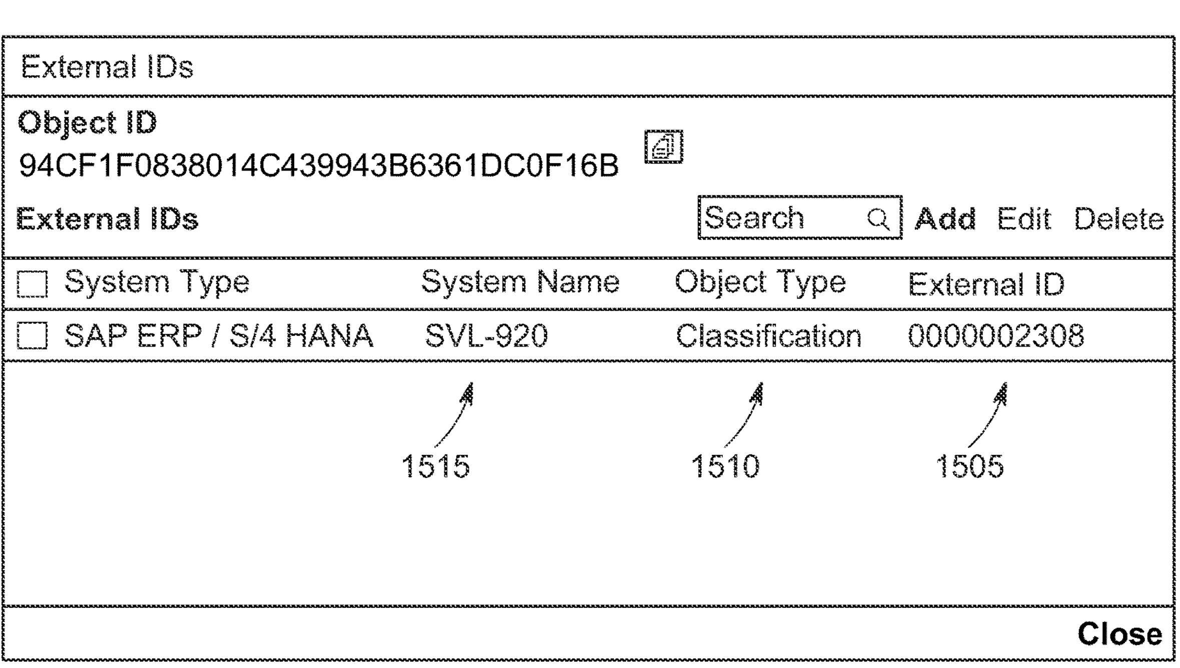
FIG. 15 is an illustrative outward facing user interface presenting a view of an external ID associated with a data object for a service, according to an example embodiment.

FIG. 14 is an illustrative outward facing user interface 1400 presenting a view related to a class (or template) type of data object where, according to an example embodiment, a "template" object type may be synchronized from multiple ERP systems to an equipment management network herein. As shown, a named class has been created as indicated at 1405 for a particular template class "TEMP_MULTIERP". UI 1400 provides an overview of the characteristics (i.e., basic data) for the template class listed at 1405, where the class is associated with the ERP system "SVL-920" that is specified at 1410. As illustrated in the illustrative outward facing user interface 1500 in FIG. 15 that includes a presentation view of the equipment management network, an external ID 1505 is displayed and associated with the "Classification" (or class) object type 1510 for the template data object created in the "SVL-920" ERP system listed at 1515. In this example, one class data object created in the "SVL-920" ERP system (as shown in FIG. 14) is replicated as a template in the equipment management network with the external ID as listed at 1505.

Figures 17, 18:
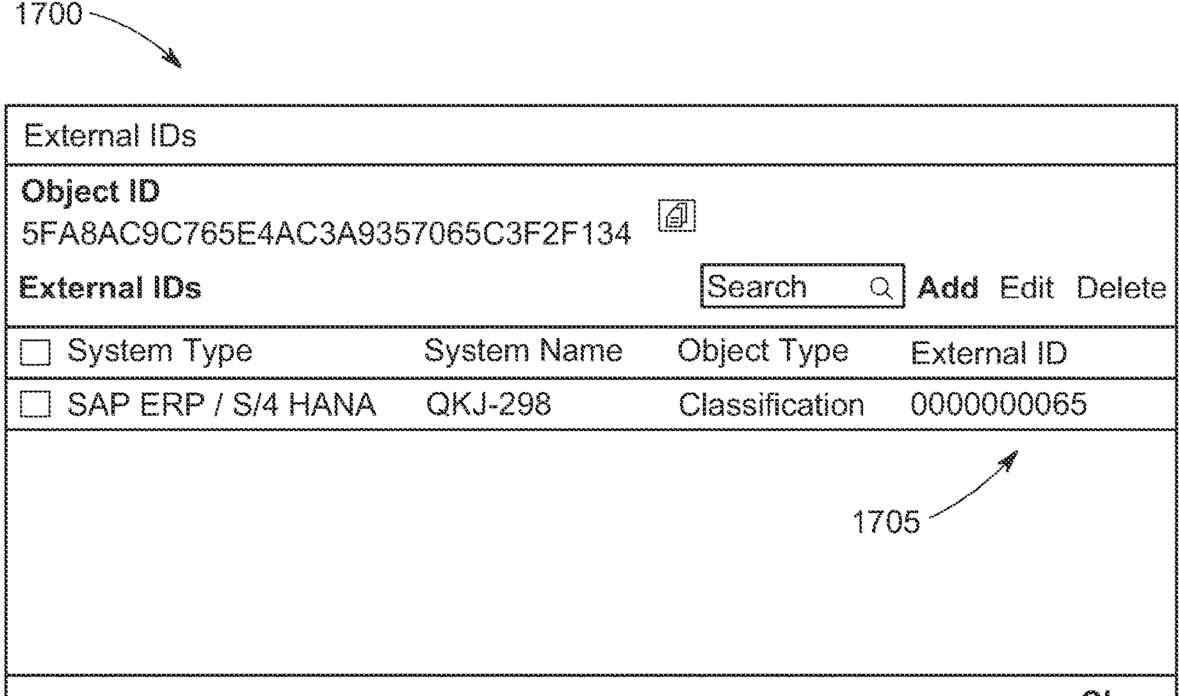
FIG. 17 is an illustrative outward facing user interface presenting a view of an external ID associated with a data object for another service, according to an example embodiment.
FIG. 18 is an illustrative outward facing user interface presenting a view of an external ID for a data object for a service, according to an example embodiment.

FIG. 16 includes UI 1600 that shows the same class as FIG. 14, but now depicted at 1605 and associated with the "QKJ-298" ERP system as seen at 1610. FIG. 17 shows the one class data object created in the "QKJ-298" ERP system (shown in FIG. 16) has been replicated as a template in the equipment management network with the external ID as listed at 1705. As demonstrated, the same class is created with the separate and distinct different external IDs in the respective ERP systems. In this manner, the same template in the equipment management network will have two external IDs, one from the "QKJ-298" ERP system and another external ID from the "SQL-298" ERP system.

As demonstrated in the examples of FIGS. 14-17, in some instances a single equipment management network template data object can have two (i.e., more than one) associated external IDs, where a first external ID belongs to a first external ERP (or other) system and a second external ID is associated with a second, different external ERP (or other) system. Accordingly, when a template is updated in the equipment management network system, a change event may be transferred to both the first and second ERP systems because the template data object has a reference to two (2) external IDs belonging to two different ERP systems.

In some embodiments, systems and processes disclosed herein may be useful and have practical applications in use cases including, for example, data objects from multiple, different entities, each with their own respective ERP (or other) system managing and processing the data objects. As an example, a manufacturer might have their data objects processed and managed in a first ERP (or other) system and an equipment operator might have their data objects processed and managed in a second ERP (or other) system. Suppose the manufacturer has configured 50 ERP systems with an equipment management network tenant. An illustrative, example scenario might include the manufacturer creating an equipment in the equipment management network that is shared with the operator (i.e., another user or business partner). When a data object representative of the equipment is shared with the operator, the operator might also want to have this equipment data object replicated or created in their respective ERP system(s). Accordingly, in this example, the equipment management network may have a single instance of an equipment with two external IDs, where one external ID is maintained by the manufacturer's ERP system and a second external ID is assigned or provided by the operator's ERP system. When the equipment is updated, the update of the equipment will not only be sent to the manufacturer's ERP system, but it will also be transmitted and updated (i.e., replicated) in the operator's ERP system.

Some earlier examples herein discussed use cases where two different ERP systems belonging to a single customer or user having multiple ERP systems (e.g., different ERP systems at different plants belonging to the customer/user) can be integrated with an equipment management network system. Now, the present example includes a scenario including two (2) different ERP systems belonging to two different organizations, entities or users where the multiple ERP systems are integrated with the equipment management network.

Referring to FIG. 18, UI 1800 presents a view of data in an equipment management network integrated with the first and second ERP (or other) systems. FIG. 18 presents a visualization of the external ID 1805 in the ERP system listed at 1810 of a first user (e.g., a manufacturer tenant) for the equipment management network data object listed 1815. In particular, FIG. 18 shows what the manufacturer might see when the manufacturer logs into the equipment management network.

Figure 19:
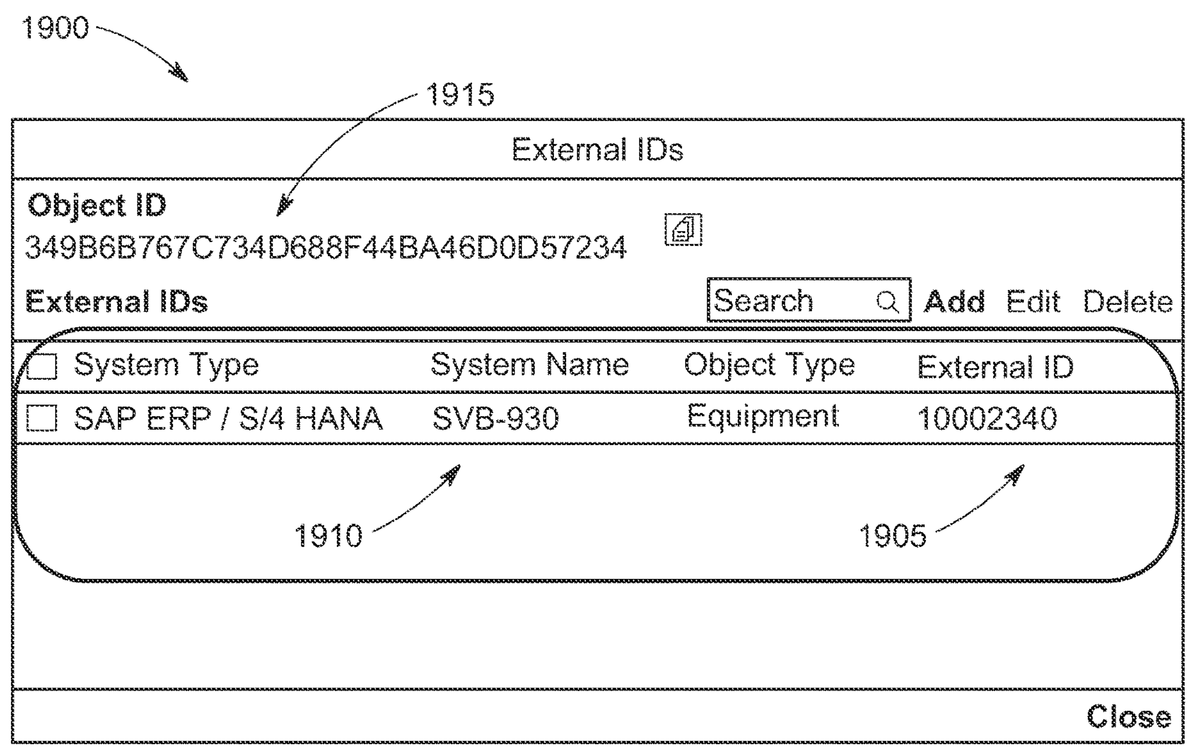
FIG. 19 is an illustrative outward facing user interface presenting a view of an external ID for the data object of FIG. 18 for another service, according to an example embodiment.

FIG. 19 is similar to FIG. 18, but shows what the second user (i.e., the operator) might see when they log into the equipment management network. As illustrated in FIG. 19, the operator may be presented with a view of the external ID 1905 in the "SVB-930" ERP system listed at 1910 for the second user (e.g., the operator) for the equipment management network data object listed 1915.

Figure 20:
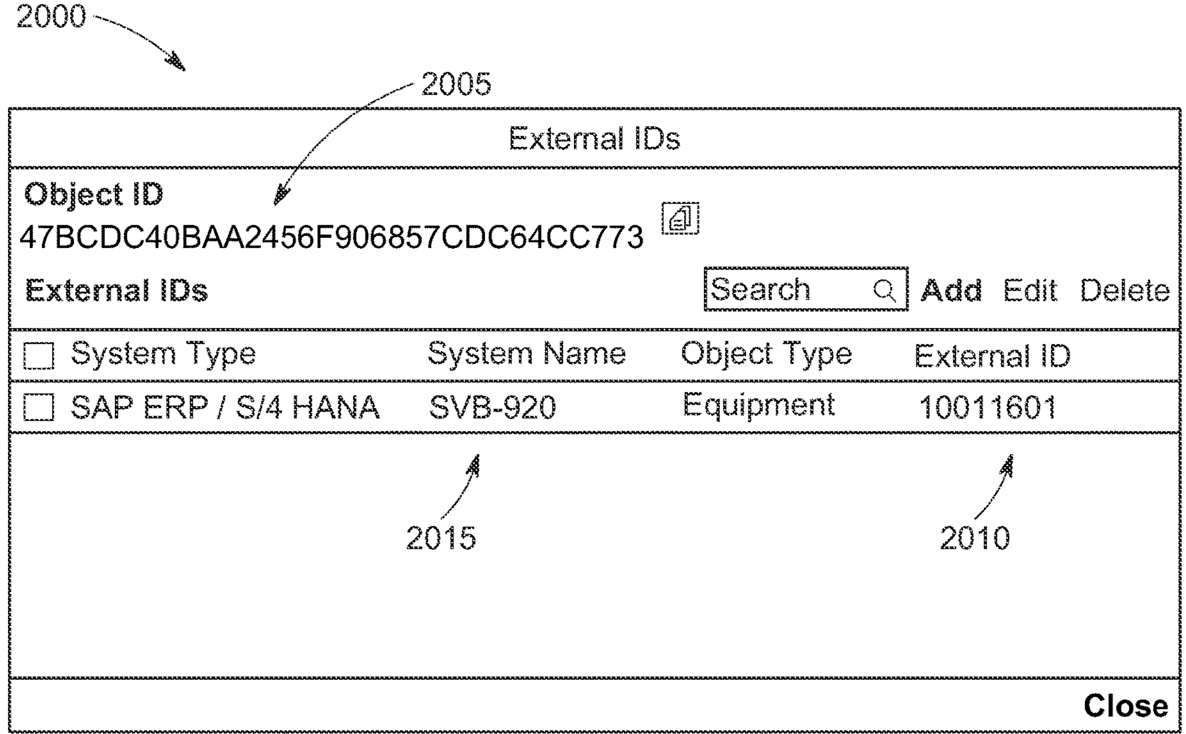
FIG. 20 is an illustrative outward facing user interface presenting a view of an external ID for a data object and its object ID, according to an example embodiment.
Figure 21:
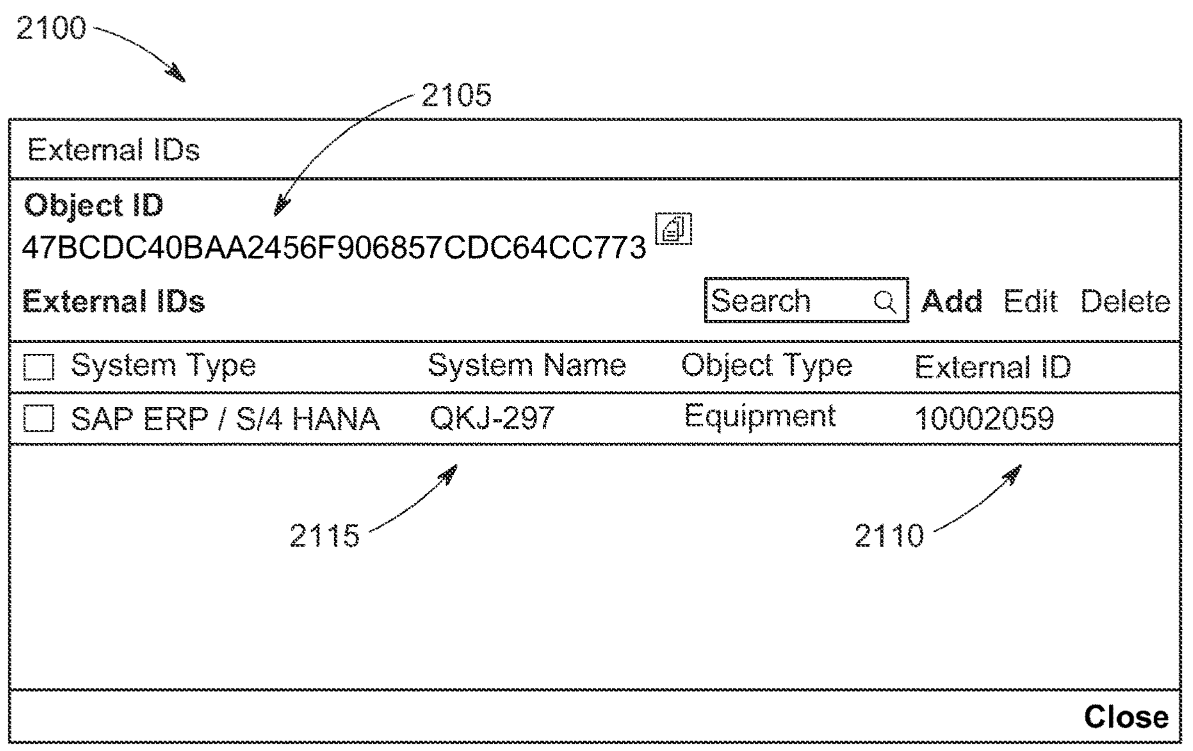
FIG. 21 is an illustrative outward facing user interface presenting a view of an external ID for a data object and the same object ID of FIG. 20, according to an example embodiment.

FIGS. 20 and 21 might address a scenario where the same equipment is mapped to two (or more) different ERP systems, where each ERP system provides their own external ID and the equipment management network uses a common reference, Object ID, for the equipment. For example, a manufacturer might create an equipment having a first external ID, wherein the equipment is shared with an operator. Accordingly, the equipment's data object may be synchronized (i.e., replicated) to the operator's backend system based on an integration configuration maintained in the operator's ERP system. In this case, equipment in the equipment management network will have two (2) external IDs, one that is maintained by the manufacturer's ERP system and external ID that belongs to the operator's ERP system.

FIG. 20 includes an illustrative outward facing user interface 2000 presenting a view of an external ID 2010 for an equipment data object of the first ERP system 2015 (i.e., the manufacturer's ERP system) that has an object ID in the equipment management network as indicated at 2005. Likewise, FIG. 21 includes an illustrative outward facing user interface 2100 including a view of an external ID 2110 for the equipment data object of the second ERP system listed at 2115 (i.e., the operator's ERP system) that has an object ID in the equipment management network as indicated at 2105. In this example, note that the object ID 2005 listed in FIG. 20 is the same as the object ID listed in FIG. 21 at 2105, even though the external IDs for the two (2) ERP systems are different.

Per FIGS. 20 and 21, for the same equipment, two different customers can have two different external IDs coming from their respective ERP systems and when the data object is updated in the equipment management network, the update or change will be transmitted to the corresponding ERP systems of two different customers since the equipment management network maintains an object ID associated with the data object that points to the two (2) different ERP systems for the particular data object.

Figure 22:
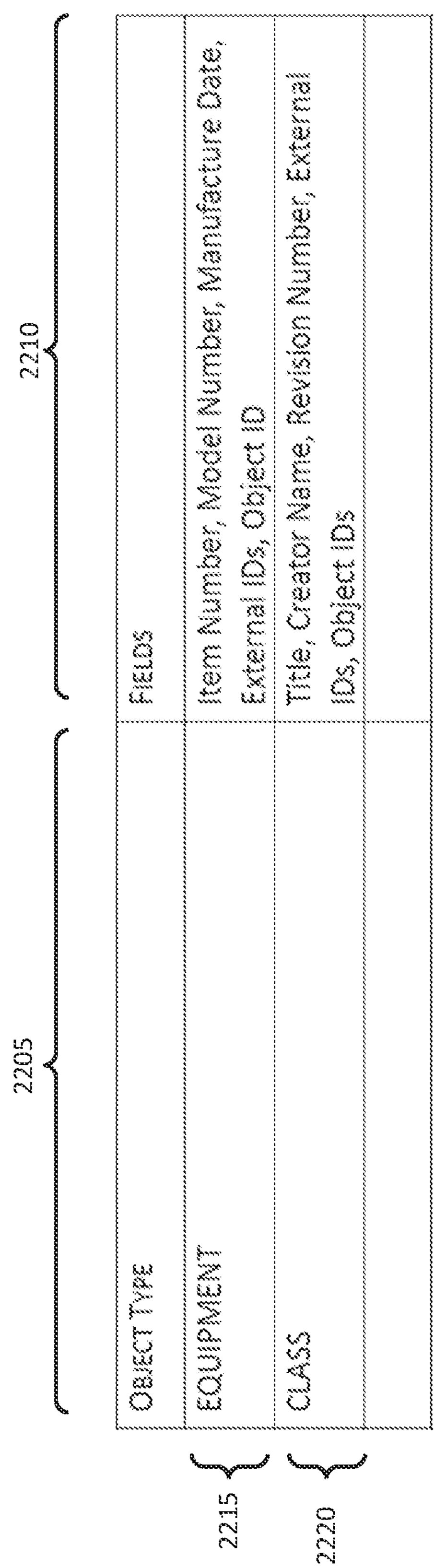
FIG. 22 is an illustrative depiction of a representation of example data related to an integrated equipment management network, according to some example embodiments.

FIG. 22 is an illustrative depiction of a representation of example data related to an equipment management network and service, according to an example embodiment. As shown, table 2200 may represent data that is stored and maintained by a collaboration platform of an equipment management network herein. Columns 2205 and 2210 refer to an object type and data fields, respectively. As shown, table 2200 lists a number of field parameters for a "Equipment" 2215 object type and a plurality of field parameters for a "Class" 2220 object type. In some instances, external IDs and object IDs associated and assigned to a data object by a creator or other owner of the data object might be included in a field 2210 of a data structure representation of the data object, as illustrated in the example of FIG. 22. Specific instances of data modeled on table 2200 might be persisted by a collaboration platform for an initial loading of an object associated with an equipment and an updating of the object. In a scenario where an object changes (e.g., the object is modified by a user having a role permitting them to edit the object and the object being editable based on the rights associated therewith), such that the data associated with the data object changes, then the data changes may be replicated and automatically pushed to the collaboration platform in an updated replicated object.

Figure 23:
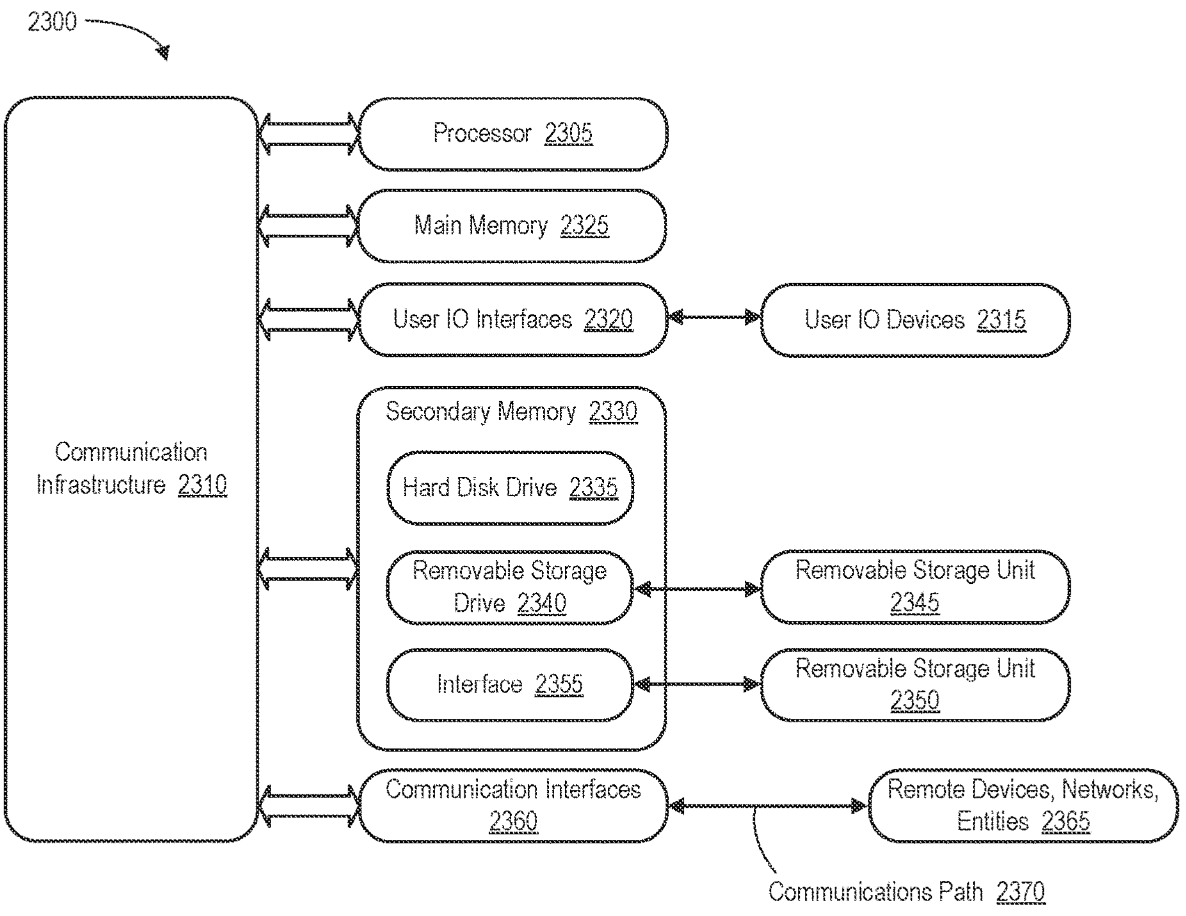
FIG. 23 is a block diagram of an apparatus useful for implementing various aspects disclosed herein, according to some example embodiments.

Various embodiments of a collaboration system and service disclosed herein may be implemented, for example, using one or more computer systems, such as computer system 2300 shown in FIG. 23. The computer system 2300 can be any computer capable of performing the functions described herein. Computer system 2300 includes one or more processors (also called CPUs), such as a processor 2305. Processor 2305 is connected to a communication infrastructure or bus 2310.

One or more processors 2305 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2300 also includes user input/output device(s) 2315, such as monitors, keyboards, pointing devices, etc., that communicate with communication infrastructure xx06 through user input/output interface(s) 2320.

Computer system 2300 also includes a main or primary memory 2325, such as Random-Access Memory ("RAM"). Main memory 2325 may include one or more levels of cache. Main memory 2325 has stored therein control logic (i.e., computer software) and/or data.

Computer system 2300 may also include one or more secondary storage devices or memory 2330. Secondary memory 2330 may include, for example, a hard disk drive 2335 and/or a removable storage device or drive 2340. Removable storage drive 2340 may be a floppy disk drive, a magnetic tape drive, a compact disk drive, an optical storage device, tape backup device, and/or any other storage device/drive.

Removable storage drive 2340 may interact with a removable storage unit 2345. Removable storage unit 2345 includes a computer usable or readable storage device having stored thereon computer software (control logic) and/or data. Removable storage unit 2345 may be a floppy disk, magnetic tape, compact disk, DVD, optical storage disk, and/any other computer data storage device. Removable storage drive 2340 reads from and/or writes to removable storage unit 2345 in a well-known manner.

According to an exemplary embodiment, secondary memory 2330 may include other means, instrumentalities or other approaches for allowing computer programs and/or other instructions and/or data to be accessed by computer system 2300. Such means, instrumentalities or other approaches may include, for example, a removable storage unit 2350 and an interface 2355. Examples of the removable storage unit 2350 and the interface 2355 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2300 may further include a communication or network interface 2360. Communication interface 2360 enables computer system 2300 to communicate and interact with any combination of remote devices, remote networks, remote entities, etc. (individually and collectively referenced by reference number 2365). For example, communication interface 2360 may allow computer system 2300 to communicate with remote devices 2365 over communications path 2370, which may be wired and/or wireless, and which may include any combination of LANs, WANs, the Internet, etc. Control logic and/or data may be transmitted to and from computer system 2300 via communication path 2370.

In an embodiment, a non-transitory tangible apparatus or article of manufacture comprising a tangible computer useable or readable medium having control logic (software) stored thereon is also referred to herein as a computer program product or program storage device. This includes, but is not limited to, computer system 2300, main memory 2325, secondary memory 2330, and removable storage units 2345 and 2350, as well as tangible articles of manufacture embodying any combination of the foregoing. Such control logic, when executed by one or more data processing devices (such as computer system 2300), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 23. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:

generating a representation of an object associated with an equipment in an equipment management network, the generating including creating and associating a first identifier for the object in the equipment management network and specifying a first service integrated with the equipment management network to associate with the object;

automatically transmitting, in response to the generating of the object, an event notification from the equipment management network to the first service to inform the first service of the object in the equipment management network;

receiving, by the equipment management network from the first service, an indication of an external identifier associated with a replication of the object in the first service;

correlating, in the equipment management network, the first identifier associated with the object in the equipment management network with the external identifier associated with the replication of the object in the first service;

storing a record of the correlation of the first identifier of the object in the equipment management network and the external identifier of the object in the first service in a data store of the equipment management network;

determining, by the equipment management network in advance of the specifying, at least a second service integrated with the equipment management network to associate with the object;

automatically transmitting, in response to the generating of the object, an event notification from the equipment management network to each of the at least second service to inform each of the at least second service of the object in the equipment management network;

receiving, by the equipment management network from each of the at least second service, an indication of an external identifier associated with a replication of the object in the at least second service;

correlating, in the equipment management network, the first identifier associated with the object in the equipment management network with the external identifier associated with the replication of the object in each of the at least second service; and storing a record of the correlation of the first identifier of the object in the equipment management network and the external identifier of the object in the at least second service in the data store of the equipment management network.

2. The method of claim 1, further comprising determining, by the equipment management network in advance of the specifying, the first service to associate with the object.

3. The method of claim 1, further comprising storing a record of the event notification transmitted from the equipment management network to the first service.

4. The method of claim 1, further comprising:

receiving, by the equipment management network from the first service, a second event notification to inform the equipment management network of a change to the replication of the object in the first service, the second event notification including an indication of the second service;

modifying, by the equipment management network, the object in the equipment management network in accordance with the second event notification;

storing a record of the modified object in the equipment management network in the data store of the equipment management network.

5. The method of claim 4, further comprising:

automatically transmitting, in response to the modifying of the object in the equipment management network in accordance with the second event notification, a third event notification from the equipment management network to at least a third service to inform the third service of the modifying of the object in the equipment management network.

6. The method of claim 5, further comprising determining, by the equipment management network, the at least third service to transmit the third event notification.

7. A system comprising:

at least one programmable processor; and a non-transitory machine-readable medium storing instructions that, when executed by the at least one programmable processor, cause the at least one programmable processor to perform operations comprising:

generating a representation of an object associated with an equipment in an equipment management network, the generating including creating and associating a first identifier for the object in the equipment management network and specifying a first service integrated with the equipment management network to associate with the object;

automatically transmitting, in response to the generating of the object, an event notification from the equipment management network to the first service to inform the first service of the object in the equipment management network;

receiving, by the equipment management network from the first service, an indication of an external identifier associated with a replication of the object in the first service;

correlating, in the equipment management network, the first identifier associated with the object in the equipment management network with the external identifier associated with the replication of the object in the first service;

storing a record of the correlation of the first identifier of the object in the equipment management network and the external identifier of the object in the first service in a data store of the equipment management network;

determining, by the equipment management network in advance of the specifying, at least a second service integrated with the equipment management network to associate with the object;

automatically transmitting, in response to the generating of the object, an event notification from the equipment management network to each of the at least second service to inform each of the at least second service of the object in the equipment management network;

receiving, by the equipment management network from each of the at least second service, an indication of an external identifier associated with a replication of the object in the at least second service;

correlating, in the equipment management network, the first identifier associated with the object in the equipment management network with the external identifier associated with the replication of the object in each of the at least second service; and storing a record of the correlation of the first identifier of the object in the equipment management network and the external identifier of the object in the at least second service in the data store of the equipment management network.

8. The system of claim 7, further comprising determining, by the equipment management network in advance of the specifying, the first service to associate with the object.

9. The system of claim 7, further comprising storing a record of the event notification transmitted from the equipment management network to the first service.

10. The system of claim 7, further comprising:

receiving, by the equipment management network from the first service, a second event notification to inform the equipment management network of a change to the replication of the object in the first service, the second event notification including an indication of the second service;

modifying, by the equipment management network, the object in the equipment management network in accordance with the second event notification;

storing a record of the modified object in the equipment management network in the data store of the equipment management network.

11. The system of claim 10, further comprising:

automatically transmitting, in response to the modifying of the object in the equipment management network in accordance with the second event notification, a third event notification from the equipment management network to at least a third service to inform the third service of the modifying of the object in the equipment management network.

12. A non-transitory, computer readable medium storing instructions, which when executed by at least one processor cause a computer to perform a method comprising:

generating a representation of an object associated with an equipment in an equipment management network, the generating including creating and associating a first identifier for the object in the equipment management network and specifying a first service integrated with the equipment management network to associate with the object;

automatically transmitting, in response to the generating of the object, an event notification from the equipment management network to the first service to inform the first service of the object in the equipment management network;

receiving, by the equipment management network from the first service, an indication of an external identifier associated with a replication of the object in the first service;

correlating, in the equipment management network, the first identifier associated with the object in the equipment management network with the external identifier associated with the replication of the object in the first service;

storing a record of the correlation of the first identifier of the object in the equipment management network and the external identifier of the object in the first service in a data store of the equipment management network;

determining, by the equipment management network in advance of the specifying, at least a second service integrated with the equipment management network to associate with the object:

automatically transmitting, in response to the generating of the object, an event notification from the equipment management network to each of the at least second service to inform each of the at least second service of the object in the equipment management network;

receiving, by the equipment management network from each of the at least second service, an indication of an external identifier associated with a replication of the object in the at least second service;

correlating, in the equipment management network, the first identifier associated with the object in the equipment management network with the external identifier associated with the replication of the object in each of the at least second service; and storing a record of the correlation of the first identifier of the object in the equipment management network and the external identifier of the object in the at least second service in the data store of the equipment management network.

13. The medium of claim 12, further comprising determining, by the equipment management network in advance of the specifying, the first service to associate with the object.

14. The medium of claim 12, further comprising storing a record of the event notification transmitted from the equipment management network to the first service.

15. The medium of claim 12, further comprising:

receiving, by the equipment management network from the first service, a second event notification to inform the equipment management network of a change to the replication of the object in the first service, the second event notification including an indication of the second service;

modifying, by the equipment management network, the object in the equipment management network in accordance with the second event notification;

storing a record of the modified object in the equipment management network in the data store of the equipment management network.

16. The medium of claim 15, further comprising:

automatically transmitting, in response to the modifying of the object in the equipment management network in accordance with the second event notification, a third event notification from the equipment management network to at least a third service to inform the third service of the modifying of the object in the equipment management network.

17. The medium of claim 16, further comprising determining, by the equipment management network, the at least third service to transmit the third event notification.

* * * * *